Jan. 2, 1940.

W. W. LASKER 2,185,259

TABULATING MACHINE

Filed Feb. 20, 1936

INVENTOR.
W. W. LASKER
BY W. A. Sparks
HIS ATTORNEY

Jan. 2, 1940.　　　W. W. LASKER　　　2,185,259
TABULATING MACHINE
Filed Feb. 20, 1936　　　13 Sheets-Sheet 3

INVENTOR
W. W. LASKER
BY *W. A. Sparks*
HIS ATTORNEY

Jan. 2, 1940.  W. W. LASKER  2,185,259
TABULATING MACHINE
Filed Feb. 20, 1936  13 Sheets-Sheet 4

INVENTOR
W. W. LASKER
BY
W. A. Spark
HIS ATTORNEY

Jan. 2, 1940.  W. W. LASKER  2,185,259
TABULATING MACHINE
Filed Feb. 20, 1936  13 Sheets-Sheet 7

INVENTOR.
W. W. LASKER
BY H. A. Sparks
HIS ATTORNEY

INVENTOR
W. W. LASKER
BY W. A. Sparks
HIS ATTORNEY

Jan. 2, 1940.                W. W. LASKER                 2,185,259
                          TABULATING MACHINE
                        Filed Feb. 20, 1936           13 Sheets-Sheet 9

INVENTOR
W.W. LASKER
BY *H. A. Sparks*
HIS ATTORNEY

Jan. 2, 1940.  W. W. LASKER  2,185,259
TABULATING MACHINE
Filed Feb. 20, 1936   13 Sheets-Sheet 11

INVENTOR
W.W. LASKER
BY *H. A. Sparks*
HIS ATTORNEY

Jan. 2, 1940.   W. W. LASKER   2,185,259
TABULATING MACHINE
Filed Feb. 20, 1936   13 Sheets-Sheet 12

INVENTOR.
W. W. LASKER
BY  *H. A. Sparks*
HIS ATTORNEY

Patented Jan. 2, 1940

2,185,259

UNITED STATES PATENT OFFICE 2,185,259

TABULATING MACHINE

William W. Lasker, Brooklyn, N. Y., assignor to Remington Rand Inc., Buffalo, N. Y., a corporation of Delaware Application February 20, 1936, Serial No. 64,969

11 Claims. (Cl. 235—61.9)

This invention relates to tabulating machines and, particularly, to improvements in the mechanisms for listing, totaling and printing the data which appears as perforations in cards or record strips, and this application is a continuation in part of my copending application S. N. 576,992, filed Nov. 24, 1931.

Tabulating machines of necessity involve a variety of specially constructed devices, because of the range of accounting problems for which they are used. However, the general structure of tabulators does not vary, no matter what may be the problem. Hence, the mechanism, which is associated with some specific function of the tabulator, must be modified according to the exigencies of the problem. Generally, data from each card, which enters the sensing chamber, is listed, totaled and printed. If there are as many as a hundred identical items in a group, the mechanism causes the printing of all of them, even though the interest is centered on the total amount and not on the individual items. A great saving would be effected if the items could be accumulated and only the totals printed.

The principal object of this invention is to provide means for controlling printing mechanisms in a record controlled tabulating machine whereby common designation data contained in a group of records may be printed on the same line of a report sheet with the totals of the associated quantitative data.

Other objects and structural details of the invention will be apparent from the following description when read in connection with the accompanying drawings, wherein.

General Description

Figure 1:
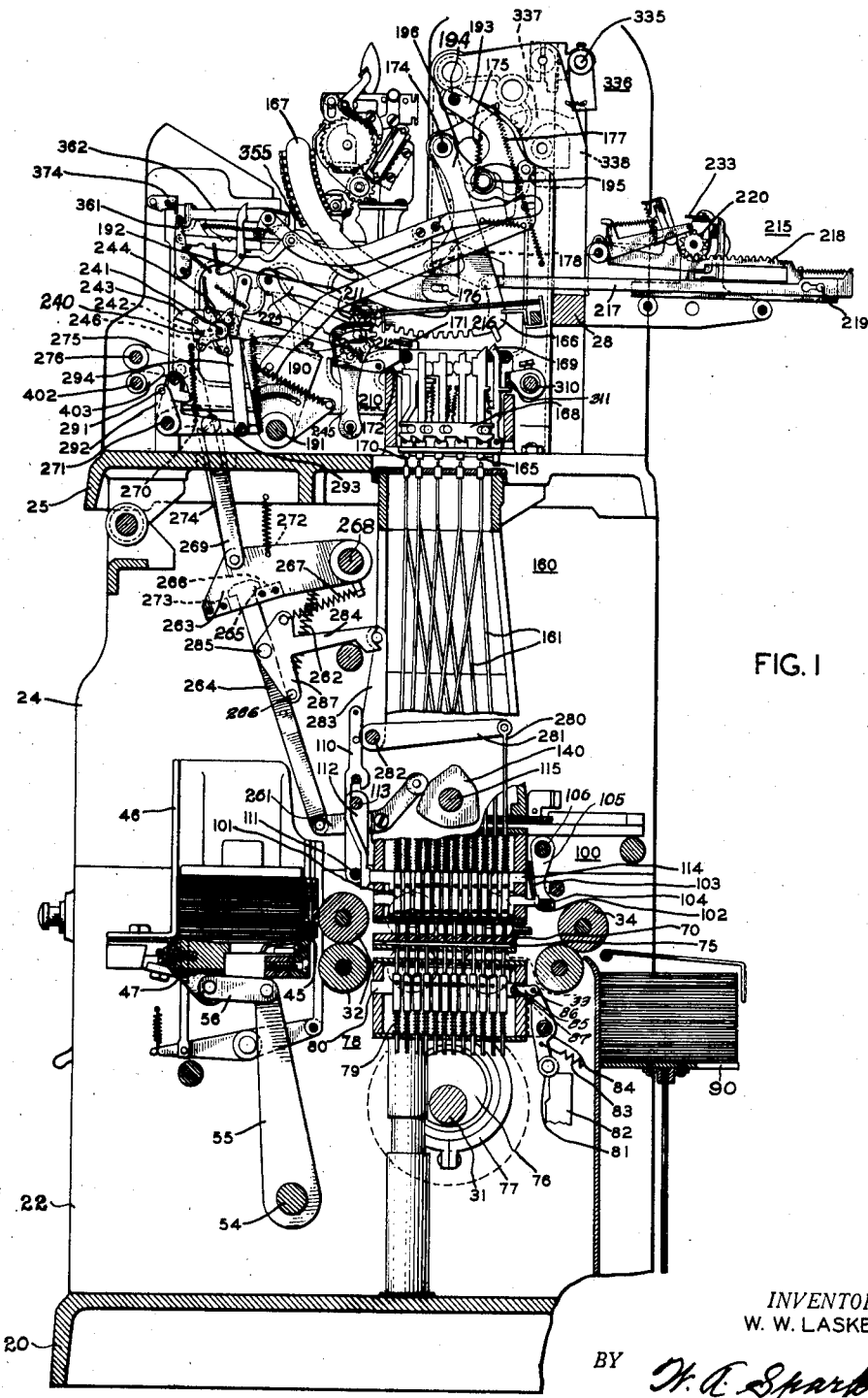
Fig. 1 is a sectional view as seen from the right-hand side and taken along an irregular line from top to bottom of the machine.

The present invention contemplates the combination of novel features hereinafter to be fully described, and a printing tabulator of well known construction.

The tabulator, to which this invention is an improvement, may be divided for purposes of description into three sections. These sections will be named in their order from bottom to top, the base, the intermediate section and the head. They comprise mechanism for the purposes to be hereinafter set forth, together with such bolts, screws, clips, pins, nuts, washers, and spacers as may be necessary for proper assembly.

The mechanisms of the base embrace the drive, the sensing, record retaining, and change-of-designation mechanisms, the mechanism for conditioning the machine for total taking, and the necessary supports therefor. Those of the intermediate section embrace mechanism for translating the data obtained from the card being sensed, and auxiliary and supplementary mechanism which will be mentioned hereinafter. Those of the head embrace the alphabetic and computing units, the printing platen, paper support and paper feed, and the mechanism associated with the functioning of these several elements.

Framework—Figures 1, 2, 4 and 5

The mechanism of the several sections named above is housed in a suitable framework. The essential elements of this framework are: a base plate 20 (Fig. 1) supporting, at its outer edges, a pair of boxlike frames 21 and 22; cross bars 23 which tie together the tops of the frames 21 and 22 (Fig. 2); open frames 24 one of which is mounted upon each of the frames 21 and 22; a plate 25 hinged to the frames 24, which plate serves as a base for the mechanism of the head, and a number of frames 27 (Figs. 4 and 5); which, with cross bars 28 mounted thereon serve as supports.

Mechanism of the base—Figure 1

The base mechanism shown herein is substantially the same as that disclosed in my Patent No. 2,044,119, issued June 16, 1936. Inasmuch as the several mechanisms that comprise the base are well known in the art, and, further, do not form a part of the printing mechanism controls, they are described herein only in sufficient detail to enable an understanding of the present invention.

Journaled in the frame 21, and extending from front to rear of the machine, is a main shaft (not shown) which drives the transverse shaft 31, feed rolls 32, skid rolls 33, and eject rolls 34 through suitable gearing. Suitable means for hand and power propulsion are provided in conjunction with the main shaft.

The shaft 31 lies horizontally and is transverse to the frames 21 and 22 in each of which it is journaled. To the right end of shaft 31 is a crank which by means of suitable linkage actuates the mechanism of the head section. The frame 22 houses cams 40, 41, 42 and 43 (Fig. 3), mounted on shaft 31, which cams control the card picker, the card stop, retract and total taking control mechanisms, respectively. Mechanisms for clutching and de-clutching the main shaft to render the mechanism active or inactive, and mechanism for actuating the card picker are also contained in frame 22. The frames 21 and 22 house gearing which drives the feed rolls. In addition, they serve as supports for the various feed roll shafts and the starting and stopping shaft.

Figure 3:
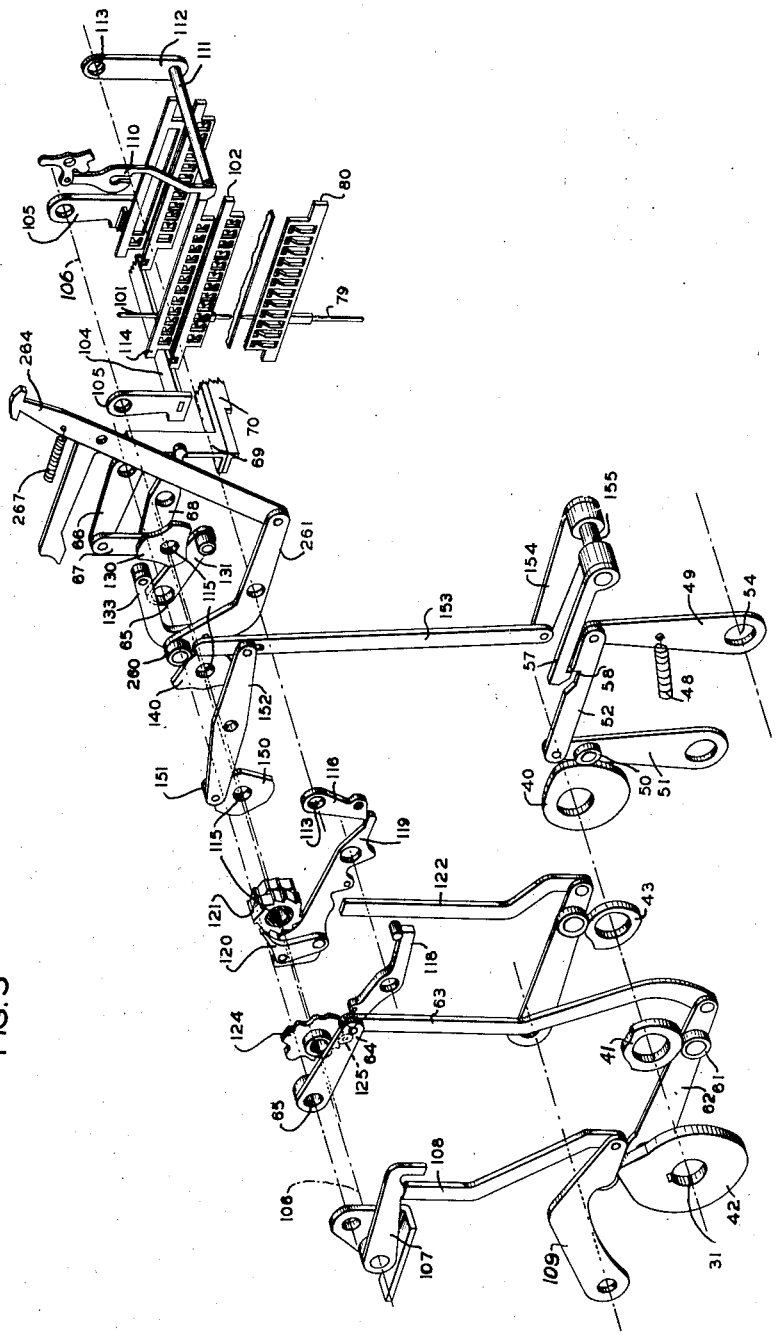
Fig. 3 is an exploded isometric showing of the total taking control mechanism.

Card picking—Figures 1 and 3

Mechanism is provided for picking the data cards singly from the bottom of a stack. The operation of this mechanism is as follows:

A stack of cards is placed in magazine 46 under a weight, which ensures proper operation of the picking edge of member 47. The spring 48 attached at one end to arm 49, and at the other end to a suitable anchorage in frame 21, maintains the follower 50 in contact with the picker cam 40. The picker cam 40, turning with the shaft 31, presents its low dwell to the follower 50 once during each cycle of the machine. When this occurs, arm 51, link 52, arm 49, shaft 54, arm 55, link 56, and picker 47 are moved rearwardly by the action of spring 48 (to the right as seen in Fig. 1), and one card is fed past throat knife 45 into engagement with the feed rolls 32, which pass it onward toward the sensing chamber 75. The high dwell on cam 40 restores picker 47 to its initial position.

Mechanism is provided whereby the picker 47 may be locked against operation. This mechanism consists of a latch 57 in cooperation with a notch 58, located in the top edge of the link 52. When totals are taken, the feeding of cards must be suspended, until the totaling operation is complete. The mechanism, which controls the latch 57, will be described under Automatic total mechanism.

Sensing mechanism—Figures 1 and 3

Mechanism such as is shown in the above cited Patent No. 2,044,119, and illustrated in Figs. 1 and 3 hereof, is provided for sensing the data which is perforated in the cards. This mechanism may be divided into three groups, namely, card stop, card sensing, and pin latching.

The operation of the card stop mechanism is as follows: when roller 61, which is mounted on arm 62, reaches the high dwell on cam 41, which turns with shaft 31, link 63 moves downwardly causing arm 64, which is mounted on shaft 65, to be oscillated. This oscillatory motion is communicated to arm 66 through shaft 65, and causes link 67 to be moved upwardly, thereby rocking lever 68 and forcing support 69 and stop 70 downwardly against the tension of spring 71, blocking the exit of the sensing chamber 75.

The operation of the sensing mechanism is as follows:

Eccentrics 76 mounted upon shaft 31, cause eccentric straps 77 to rise each time the shaft 31 turns and thereby elevate the sensing box 78, which is pinned to said eccentric straps. The pins 79 are sustained by their respective springs and hence rise with the sensing box. Those pins 79 which find perforations in the card in the sensing chamber retain the fixed relation to the sensing box and pass through the perforation. Those pins, which do not find perforations, are held down against their respective springs, whereupon those pins which are elevated are locked by slides 80.

The operation of the mechanism which locks the sensing pins 79 during sensing is as follows:

Immediately after the rising sensing pins 79 pass into the perforations in the sensing chamber, the rising sensing box 78 removes roller 81 from contact with the fixed cam 82. The spring 83 causes the lever 84 to rock counterclockwise as viewed in Fig. 1. Links 85, one for each locking slide, are supported between rod 86 and rod 87. The counterclockwise rocking of lever 84 will, therefore, cause the notches at the top of the slots in locking slides 80 to engage the extrusions on those sensing pins 79 that are in elevated position. Upon the descent of the sensing box 78, the roller 81 again contacts the stationary cam 82 and the locking slides 80 are retracted and the sensing pins 79 are released.

Card ejecting—Figure 1

When card stop 70 is elevated, which occurs just after the receding sensing pins are clear of the sensing chamber, the card moves onward under action of skid rolls 33 (Fig. 1), until it is engaged by eject rolls 34, which carry it onward into receptacle 90.

Record retaining—Figures 1 and 3

Supported on the cross-bars 23 is the record retaining mechanism 100 of the form disclosed in above cited Patent No. 2,044,119.

The record retaining mechanism operates as follows: Each of the record retaining pins 101 is arranged in exact vertical alignment with its corresponding sensing chamber perforation and sensing pin 79. A locking slide 102, urged to locking position by spring 103, is associated with those pins 101 which correspond to a single column of a card. The general structural features of slides 102 are the same as those of slides 80. Each pin 101 has a flattened portion, which carries two extrusions, one for locking the pins and the other for use in connection with the change-of-designation mechanism. As a record retaining pin 101 is elevated by the action of a sensing pin 79, the locking extrusion wipes the cam shaped side of the associated slot in slide 102, against the action of a spring 103, until the extrusion snaps into the notch at the top of its slot and is locked in upper position thereby.

When retaining pins 101 rise in response to the sensing of the next succeeding card, the extrusions on these pins cam the locking slide as described above, and in so doing release the previous setting of the record retaining pins. However, in order to decrease the time of operation of the record retaining unit and for other purposes to be considered later on a bail 104 is provided. This bail is supported between arms 105 which are fixedly mounted on shaft 106. An arm 107 (Fig. 3) also fixed on shaft 106 is maintained in cooperable relation with link 108 by the united action of springs 103. The link is pivotally mounted at its lower end to an arm 109 which is journalled on a stud in frame 22 and which cooperates with cam 42 through a follower journalled on the side of the arm.

*Change of designation—Figures 1 and 3*

Mechanism is provided whereby totals may be taken, when there is a change in the subject matter indicated by perforations in any preselected column of the card. Such a change is generally called a "Change of designation", and the mechanism associated with the operation is called "change of designation mechanism".

The operation of the change of designation mechanism is as follows:

The manipulative interponent 110, associated with the column in which the designatory matter appears, is lowered until its bottom end stands between the bail 111, which is supported by arm 112 fixed on shaft 113, and the end of a slide 114. As disclosed in Patent No. 2,044,119, the slide 114 has a cam surface along one of the sides of each of its slots. Since, any pin 101, which is elevated by reason of sensing of a perforation in a card, will remain elevated by the action of a corresponding locking slide 102, the pins remain elevated as long as the perforation in the pre-selected column remains unchanged as to location. When the position of the perforation changes, the upper extrusion on pin 101 cams the slide 114 forwardly, releasing the previously elevated pin 101 and forcing the associated interponent 110 and bail 111 forwardly, thereby tripping the automatic totaling mechanism, as will now be described.

*Total taking control mechanism—Figures 1 and 3*

A totaling cycle may be initiated by special conditions such as special total cards (a special perforation in the 12th position or 45th column), change of designation (a shifting of any one or more of a set of pre-selected slides 114), rocking of shaft 113 manually, etc. Whatever the origin of the initiation of a totaling operation, it is initiated by rocking shaft 113. The conditions differing from a normal accumulating cycle are controlled by a set of cams on the intermittently operated shaft 115 (Figs. 1 and 3). A totaling cycle is usually initiated as an incident to the sensing of a card in the sensing chamber. This card should not have its items added into the totalizers at this time nor should it be ejected, therefore, it must be held in the sensing chamber, the stop setting function of the sensing pins 79 must be disabled, or what amounts to the same thing the actuator stops must be retracted before the actuators start forward, and the picker must be disabled to prevent the feeding of another card into the sensing chamber.

To accomplish this, mechanism, such as that described in above cited Patent No. 2,044,119, is provided to prevent card feeding, to hold the card stop 70 in active position, and to hold the sensing pins 79 retracted until the total operation is completed.

The operation of the automatic totaling mechanism is as follows:

During tabulator cycles latch 116 (Fig. 3) supported by bracket 117 (Fig. 2), engages detent arm 118 and arm 119 (see Fig. 3) and holds pawl 120 from being actuated by cam 43. When a total taking operation is initiated, shaft 113 is rocked, thereby rocking tripping latch 116 fixed to said shaft 113. This motion of the tripping latch 116 releases arm 119 and permits it to rock counter-clockwise to position pawl 120 for actuating ratchet 121. Cam 43 on shaft 31 then rotates to raise rod 122, arm 119 and pawl 120, causing ratchet 121 to turn the shaft 115 one tooth space and thus position the detent 124 so that roller 125 rests in a shallow notch. In turning, shaft 115 positions the card stop and retract cam 130 to force the card stop 70 downwardly, through the medium of arm 131 fixedly mounted on shaft 65, thereby retaining the card then in the sensing chamber; and simultaneously retracting latches 102 through the medium of arm 133 fixedly mounted on shaft 106, thereby preventing the setting of those pins 101, which correspond to perforations in the card then in the sensing chamber. The next rotation of cam 43 advances the shaft 115 one more notch, as measured on the detent and the total cam 140 turns to actuate the totaling mechanism as will be shown under Control of total shafts.

Cam 150 which is mounted also on shaft 115, has in the meantime acted upon follower 151, thereby causing arm 152 to be oscillated about its fulcrum to force link 153 downwardly and rock arm 154 and shaft 155, which sets latch 57 to engage the notch 58 in the link 52 of the picker mechanism.

Figure 2:
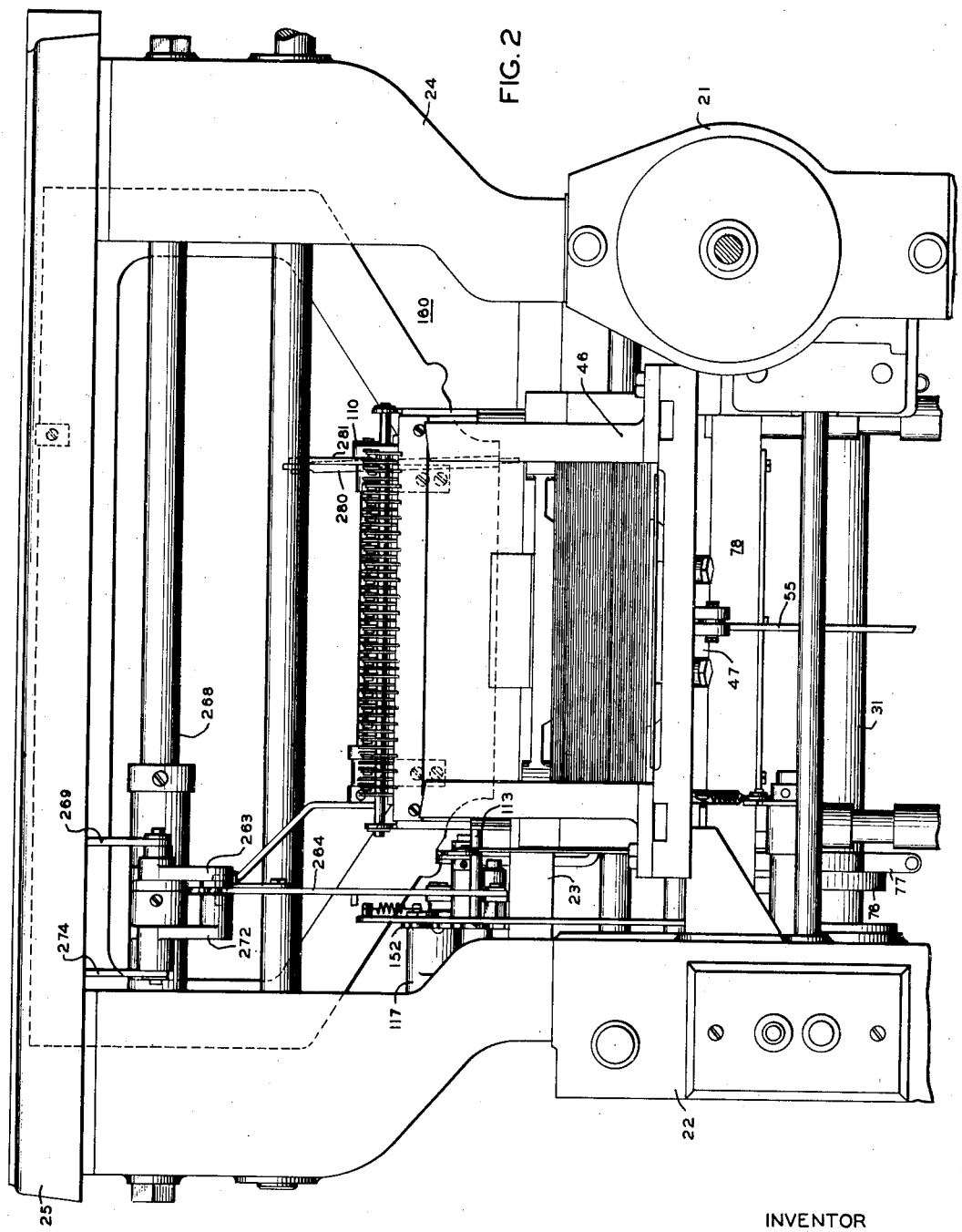
Fig. 2 is a front elevation of the intermediate section surmounting the upper portion of the base section and includes the base plate of the head section.

*Mechanism of intermediate section—Figures 1 and 2*

Frames 24 provide space for the translator unit 160 (sometimes called connection box). These frames also support shafts, links and levers incidental to the control of a portion of the mechanism of the head, all of which functions will be taken up under appropriate headings.

*Translators—Figures 1 and 2*

The translator units, which may be selected for use in connection with the mechanism of the present invention, follow the principles of design and construction previously disclosed in many patents to Powers and to Lasker.

In Fig. 1 of this application, there is shown conventionally a typical arrangement of translator unit wiring. It is well known that the wiring arrangement may be varied to suit the solution of a particular problem. In a translator unit there are a number of wires 161 equivalent to the number of record retaining pins 101. Whenever a record retaining pin is elevated by a sensing pin 79, the corresponding wire 161 is also elevated.

Head section—Figures 1, 4, 5 and 6

Mechanisms are provided in the head for accumulating and printing the totals of numeric values, for printing word descriptions of the printed entries, and for controlling the operation of the first two named mechanisms. "Computing units" is the term usually applied to the groups of mechanisms associated with the totaling. "Alphabetic units" is usually accepted as a correct term for the groups associated with printing word descriptions.

The mechanism of a computing unit comprises a stop basket, the stop elements of which are arranged in columns, with type carriers, actuators, accumulators, and printing hammer mechanisms equal to the number of columns of stop elements. Computing units will be provided with both front and rear accumulator, when grand totals are to be taken; otherwise only front accumulators will be present. An alphabetic unit comprises a stop basket, the design of which is, in general, similar to that of a computing unit, type carriers and printing hammer mechanisms, there being one of each for each column of stop elements.

The mechanism, which is classifiable as "controlling" means comprises; total shafts, non-add shaft and its controlling mechanism; mechanisms for setting accumulators for totaling operations, for releasing zero stops, for setting slam checks, for disabling conflicting totalizers, for releasing non-add mechanism, for setting sub-total slides, for controlling non-add shaft, for changing the timing of totalizers and for special control of printing hammers. There are provided, also, means for suporting and feeding paper and mechanism for controlling line spacing. These various mechanisms will be described hereinafter.

Figure 7:
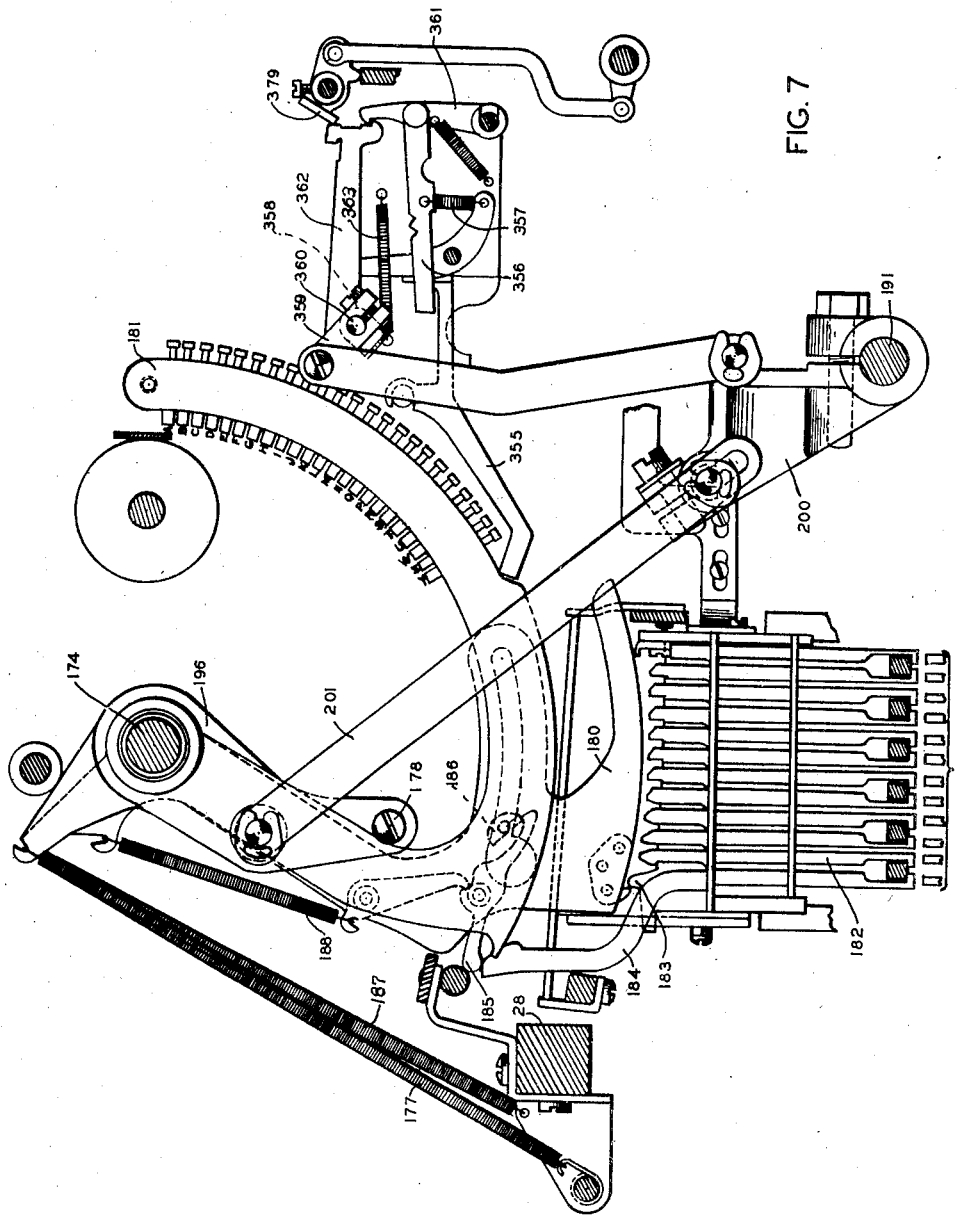
Fig. 7 is a diagrammatic elevation of an alphabetic type carrier and stop basket.

Stop baskets—Figures 1 and 7

Mechanism is provided for stopping the type carriers at a point which will give a printed record of the perforations as they are translated by the translator unit. This mechanism is frequently called a "stop basket", a typical form being shown in Fig. 1, and another (alphabetic) in Fig. 7.

The form of stop basket adapted for use herein is that disclosed in patent to Lasker No. 1,780,621, dated November 4, 1930, and is generally called a ninety-column basket. Interpretation of ninety (90) column two-hole code makes use of the combination of each odd digit and nine (9) to produce the next higher even digit. Each elevated wire 161 sets a stop 165 in position to intercept its associated actuator sector 166 and type carrier 167 to produce a record, which is in accordance with the interpretation given by the wire. The elevation of any stop 165 causes an extrusion thereon to cam against its associated tooth on slide 168, forcing said slide rearwardly. The cam face at the rear end of slide 168 acts upon an extrusion on zero stop 169, drawing it downwardly and releasing actuator 166. The elevation of block 170 by the wire 161 which is associated with digit nine causes the release of actuator 166 as above described, cross bar 171 serving as the stop for the nine (9) position.

When any stop is elevated, in conjunction with block 170 to set an even digit, the toe at the top of block 170 is moved out of contact with its check plate 172, and is, therefore, free to be set forward by the action of actuator 166 in contact with the raised stop 165. The amount of the forward set is sufficient to bring the actuator to a position corresponding to the even digit next above the associated odd digit. When zero is to be printed, there is no actuation of mechanism since all actuators 166 are initially at zero position.

Figure 6:
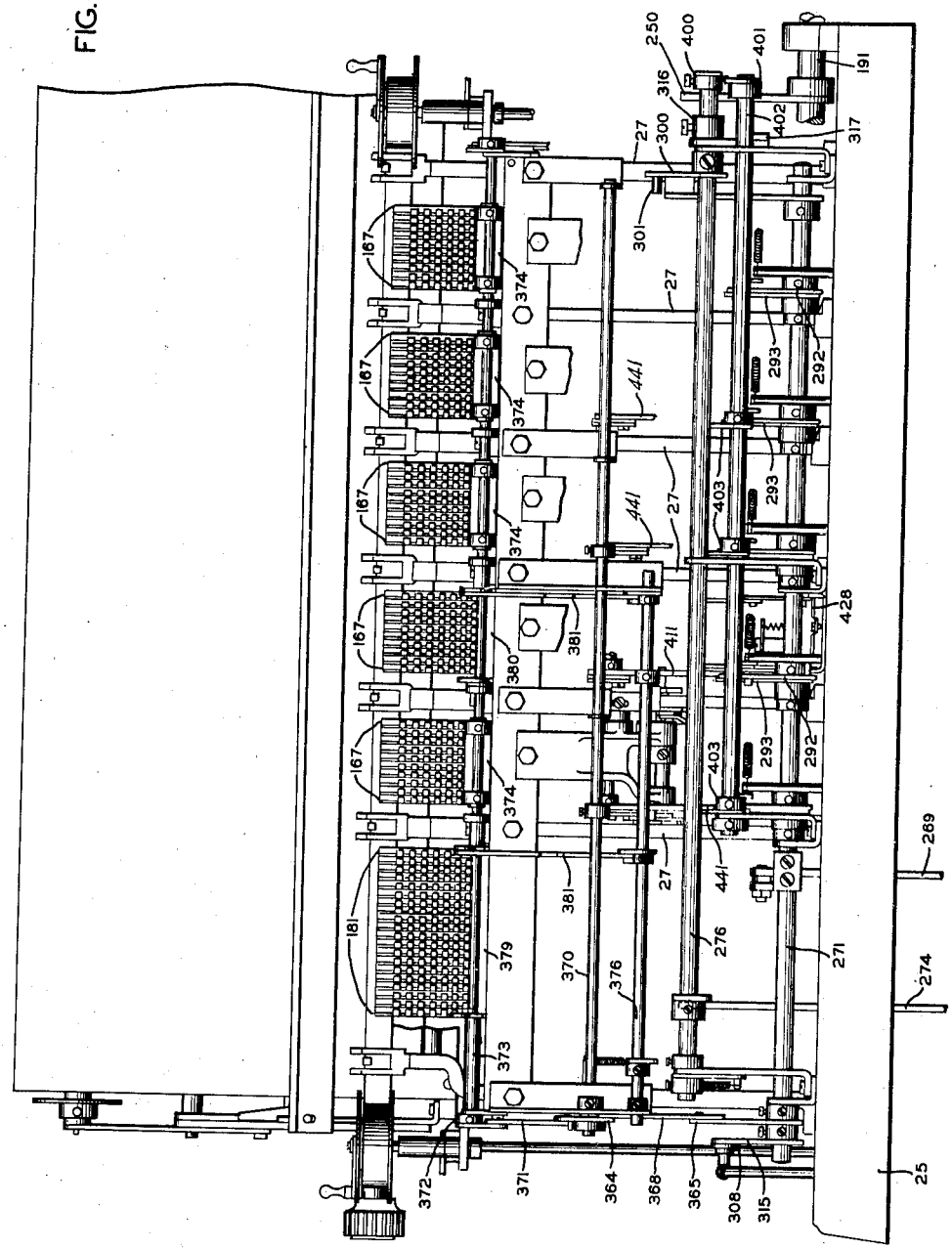
Fig. 6 is a front elevation of the head section showing the relation between the elements of Figs. 4 and 5, together with other essential elements.

Actuators and type carriers—Figures 1, 6 and 7

Mechanism is provided in numeric units for setting type in a position for printing the interpretation of the perforation in the card. This mechanism is disclosed in patent to Powers No. 1,245,502, dated November 6, 1917, and is shown in Figs. 1 and 6 hereof.

Actuator sector 166 and type carrier sector 167 are journaled on shaft 174 and are constrained to maintain a fixed relation to each other by spring 175 and pin 176. Spring 177, which is normally kept under tension, by means to be hereinafter described, is attached at its upper end to the rearwardly extending arm of type carrier 167 and at its lower end to a suitable spring anchor.

Means for actuating accumulator wheels is provided by cutting gear teeth on the forwardly extending portion of actuator sector 166. Hence, sector 166 acquires the generally accepted title of actuator.

The operation of the actuators and type carriers is as follows: Bail 178, the construction and operation of which will be described hereinafter, swings forwardly after stops 165 are set. Springs 177 cause type carriers 167 and actuators 166 to follow bail 178 until a set stop intercepts the heel on actuator 166.

Modification of the type setting means of the numeric units is necessary in alphabetic units (see Fig. 1). These modifications apply particularly to members 166 and 167. Actuator 166 of the numeric unit is replaced by stop sector 180, and type carrier 167 is replaced by type carrier 181. This mechanism has been previously disclosed in my Patent No. 1,768,526, issued June 24, 1930.

The operation of an alphabetic sector is as follows:

A stop 182 in an aliphabetic stop basket is elevated and in so doing withdraws shutter 183 from the path of stop sector 180 and permits the heel on sector 180 to advance and contact stop 182. If the letter sensed lies in the last half of the alphabet, alphabetic release stop 184 is elevated by reason of the sensing of a special control perforation and trips lever 185, releasing pin 186 and causing type carrier 181 to be extended under combined action of springs 187 and 188. As in the numeric sector, the contact of the heel on the stop sector 180 with a stop pin 182 in the stop basket positions the type carrier 181 for printing.

Type carrier control—Figures 1 and 7

Mechanism is provided in each computing unit to control the advance and return of the type carriers. This mechanism has been disclosed in many of the applicant's prior patents, including Patent No. 1,780,621, dated Nov. 4, 1930, and is illustrated in Figs. 1 and 7 of the present application.

The operation of this mechanism is as follows:

Fan cam 190 (Fig. 1), moving forwardly under control of oscillating shaft 191, pulls link 192 and oscillates cam 193, clockwise about shaft 194. Follower 195, mounted on arm 196, is constrained to follow the path of cam 193 and in so doing rocks arms 196 and bail 178 clockwise about shaft 174, thus permitting type carriers 167 to advance. The return of fan cam 190 will obviously reverse the direction of motion of the above described members and return type sectors 167 to their initial position.

Mechanism, which is a modification of that just described, is provided in each alphabetic printing unit for the control of the advance and return of its type carriers. This mechanism is fully disclosed in the cited patent to Lasker No. 1,768,526, and is shown herein in Fig. 7.

The operation of this mechanism is as follows:

The forward oscillation of shaft 191 moves arm 200 forwardly and pulls link 201. This motion rotates arms 196 counter clockwise about shaft 174 and causes bail 178 to be advanced. Alphabetic type carriers 181, under the influence of their associated springs 177, advance until blocked by a set stop 182, thus positioning the type according to the perforations in the sensed card.

Spring 187, attached to the rearward extension of arm 196, assists in the positive action of the above described mechanism.

The return of shaft 191 will obviously cause a reversal of the direction of motion of the elements of this mechanism and thus type carriers 181 will be restored to normal.

*Accumulators—Figures 1, 4, 5 and 13*

Mechanism is provided in each computing unit for accumulating the numeric values sensed in the cards. If totals of groups and grand totals of group totals are desired, two sets of mechanism for accumulating are required. For convenience, these respective mechanisms will be called the front totalizers and the rear totalizers.

Figure 8:
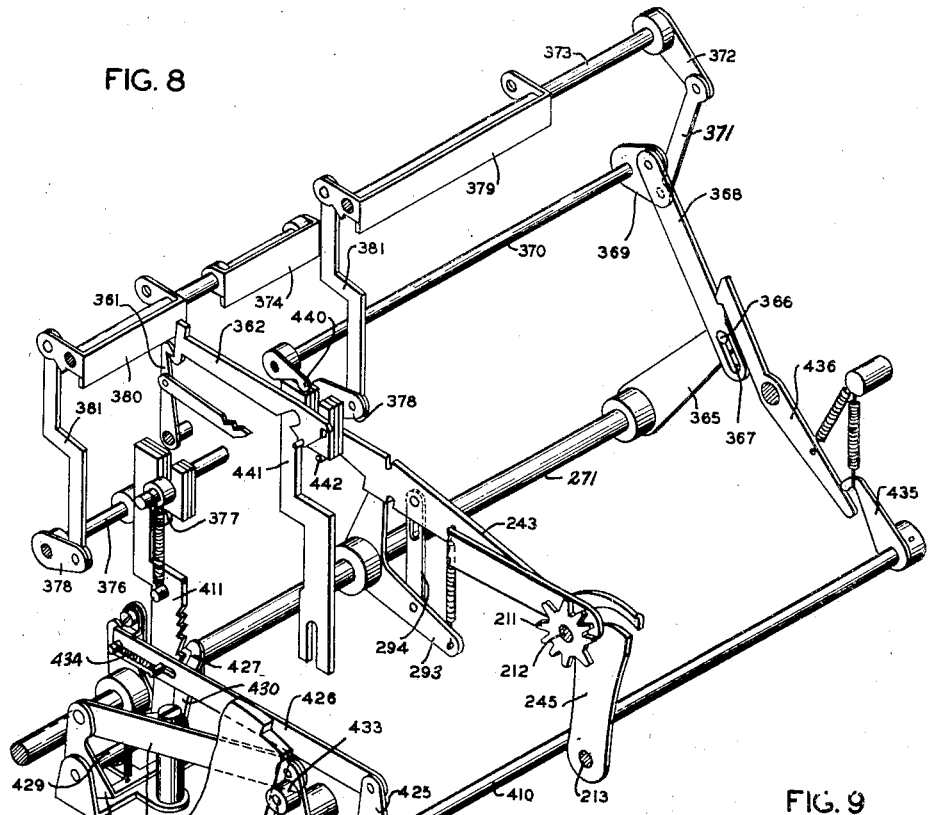
Fig. 8 is an isometric view of the non-print bail controlling mechanism.

The mechanism of a front totalizer 210 is shown in Figs. 1 and 8 and is substantially the same as that disclosed in the patent to Powers No. 1,245,502.

The operation of the front accumulating mechanism is as follows:

Let it be assumed that accumulator wheels 211 are in mesh with actuators 166. Each accumulator wheel 211 has ten teeth, the spacing of which is the same as that of the type on carriers 167 and on actuators 166. Hence, each actuator 166 is suited to turn its associated wheel 211 mounted on shaft 212 through a number of teeth corresponding to the digit which has been set.

The mechanism of the rear totalizer 215 is substantially the same as that disclosed in my copending application S. N. 681,333, filed December 18, 1923, and is shown in Figs. 1, 4, 5 and 13. It consists of pin 216, link 217, actuator rack 218, pin 219, accumulator wheels 220, shaft 221, camming plates 222 and shaft 223. The forward end of link 217 is journaled on pin 216, which is fixedly attached to actuator 166. The rearward end of said link is supported by the pin 219, which is mounted in actuator rack 218. Accumulator wheels 220 are mounted on shaft 221, which is carried by camming plates 222 fixedly mounted on shaft 223.

The operation of the rear totalizer 215 is as follows:

Let it be assumed that accumulator wheels 220 are in mesh with actuator racks 218. Each accumulator wheel 220 has ten teeth and, when an actuator rack 218 is advanced under the influence of an actuator sector 166, the associated accumulator wheel 220 will advance a number of teeth corresponding to the setting of the stop 165 in the associated column in the stop basket.

*Transfer mechanism—Figures 1, 4, 5 and 13*

Mechanism, commonly referred to as "transfer mechanism", is provided. In tabulators, which are equipped with front and rear totalizers, it is obvious that two sets of transfer mechanism are necessary.

The transfer mechanism for front totalizers is disclosed in the patent to Powers No. 1,245,502, dated November 6, 1917, and is shown in Fig. 1 of the present application. It consists of a tripping tooth integral with the tenth tooth of each accumulator wheel 211 and stop arm 225.

The operation of this mechanism is well known and need not be described further.

The transfer mechanism of the rear totalizer is disclosed in my cited copending application S. N. 681,333, and is shown in Figs. 1, 4, 5 and 13 of the present application. It consists of tripping tooth 227, arm 228, spring 229, latch 230, bar 231, pin 232, and adjustable bar 233.

The operation of this mechanism is as follows:

Tripping tooth 227 contacts arm 228, lowering it sufficiently to permit spring-pressed latch 230 to snap under bar 231 and to lower pin 232, fixed in arm 228, to permit actuator rack 218 to advance one tooth space and thus add one in the accumulator wheel of the next higher order. Adjustable bar 233, which is carried by camming plates 222 strikes latches 230, releasing them and permitting arms 228 to be restored.

*Totalizer timing—Figures 1, 5, 6, 8 and 10*

Mechanism is provided for engaging and disengaging the accumulator wheels and actuators at the proper time in the cycle of the machine for an adding operation. This mechanism is properly divisible into two groups, i. e., that associated with the front totalizers and that associated with the rear totalizers. The mechanism for timing the front totalizer is disclosed in the cited patent to Powers No. 1,245,502 and is illustrated in Figs. 1 and 8 hereof.

The operation of the front totalizer timing mechanism is well known. Fan cam 190 rocking forwardly with shaft 191, upon which it is fixedly mounted, contacts wiper 240, causing it to turn shaft 241 and rocker 242 clockwise as viewed in Fig. 1. The upper notch in link 243, thus brought into engagement with pin 244 by the forward travel of fan cam 190, will cause link 243 and camming arms 245 to move rearwardly. Shaft 212, which is supported by arm 245, will then lie in the low dwell of the cam slots in said arms 245. The rearward travel of fan cam 190 will reverse the motion of members 243 and 245 and draw accumulators into engagement with actuators 166 at approximately the time when they are ready to return after a printing operation.

Figure 5:
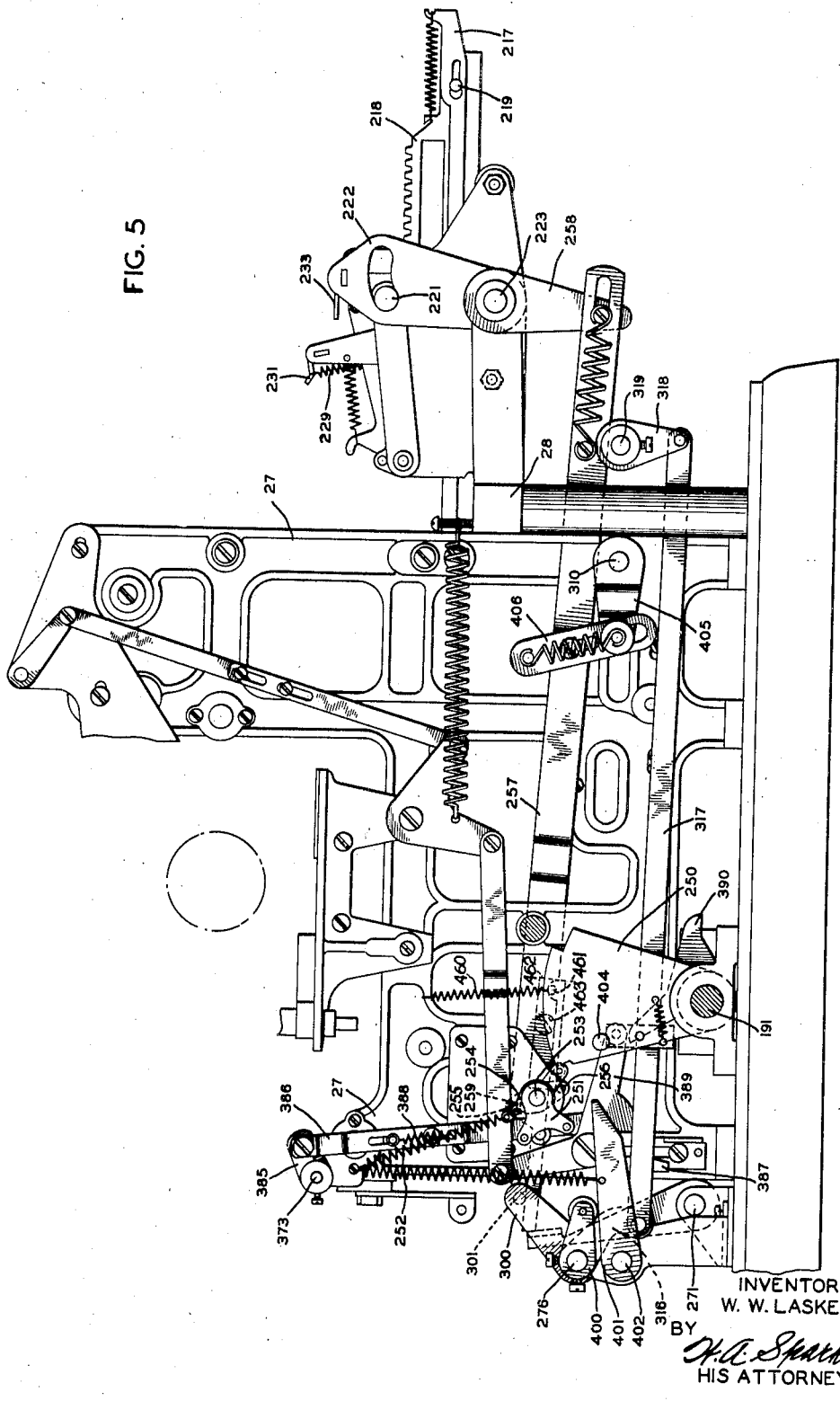
Fig. 5 is a right-hand side elevation of the head section showing other essential elements of the invention.
Figure 10:
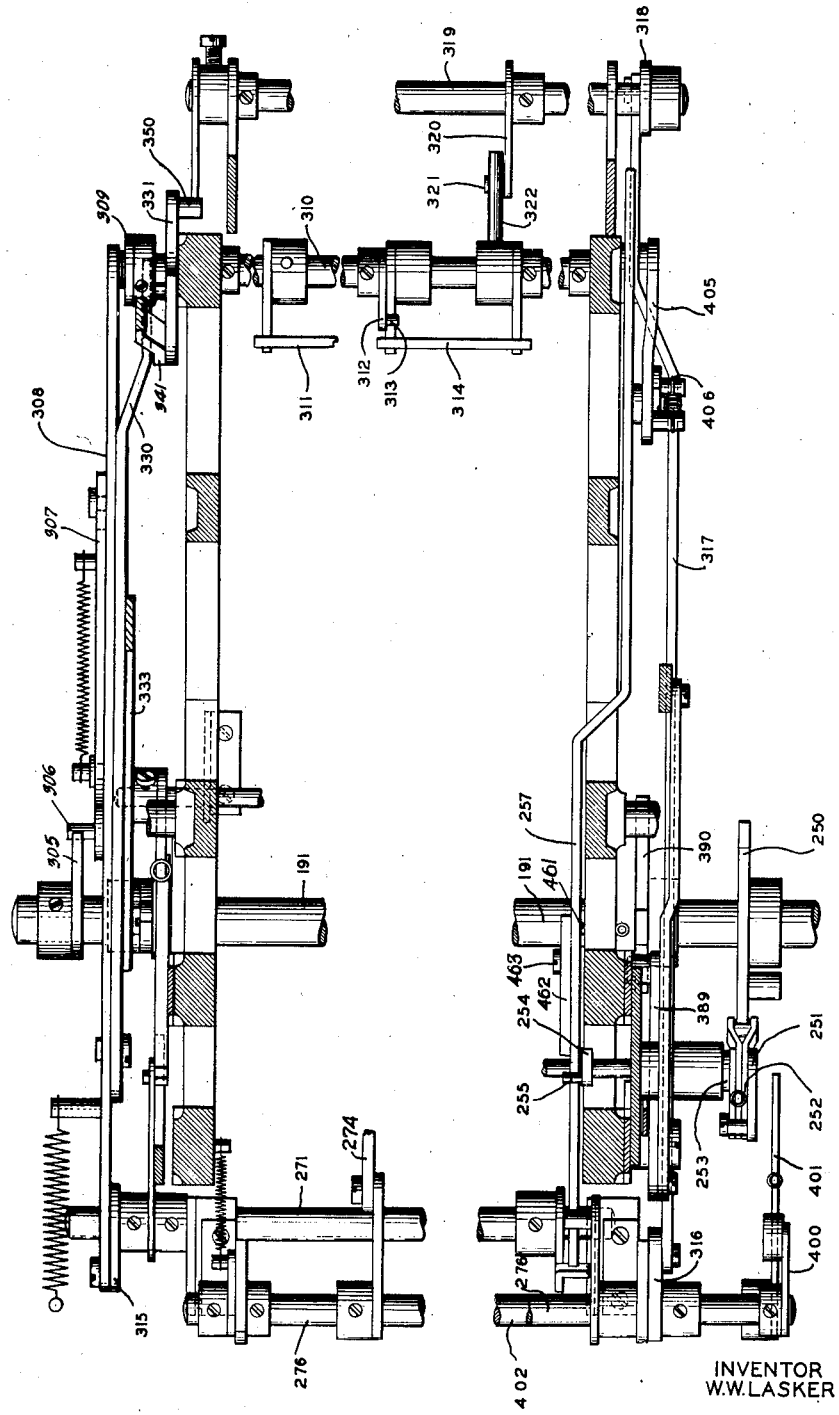
Fig. 10 is a partial section in plan through the head section emphasizing the mechanism of the invention.

The mechanism for timing the rear totalizer, which is substantially the same as that disclosed in my cited copending application S. N. 681,333, is shown in Figs. 5, 6, and 10 hereof and consists of shaft 191, fan cam 250, wiper 251, spring 252, shaft 253, rocker 254, pins 255 and 256, link 257, crank 258, shaft 223 and camming plates 222. Fan cam 250 is fixed to shaft 191. Wiper 251, shaft 253 and rocker 254 are assembled in the same manner as is the like mechanism associated with the front totalizers. The forward end of link 257 is urged upwardly by a spring 460, extended between the frame of the machine and a stud 461 that extends beneath the lower edge of link 257 and is mounted on a latch 462 which, in turn, is pivotally mounted on link 257 at 463. In this manner, a notch 259, cut in the upper edge of link 257, is normally urged into engagement with the upper pin 255 on rocker 254. The arrangement of latch 462 is such that, in the normal position of the parts as shown in Fig. 5, the lower edge thereof is substantially parallel to and lower than the lower edge of link 257 and the forward edge thereof overlies and extends beyond pin 256 on rocker 254. The rearward end of link 257 is attached by a spring and pin in slot connection to a crank 258, fast on shaft 223. Also fast on shaft 223 are the camming plates 222 which support the shaft 221 on which the rear accumulator wheels 220 are mounted.

During accumulating cycles, the operation of the rear totalizer timing mechanism is identical in principle to the corresponding mechanism of the front totalizers, i. e., at the beginning of each cycle, the forward movement of fan cam 250, by means of wiper 251 and pin 255 on rocker 254, serves to shift link 257 rearwardly to rock shaft 223 counter-clockwise and thereby cam wheels 220 out of engagement with racks 218 prior to the forward movement of the racks; whereas, slightly after the midpoint of each cycle, the rearward movement of fan cam 250 shifts link 257 forwardly and thereby causes the engagement of the totalizer prior to the rearward movement of the racks so that the amount registered by the racks is rolled into the rear wheels.

*Control of total shafts—Figures 1, 3, 5, 6, 8 and 10*

Mechanism is provided for controlling the timing of the totalizers to extract the totals. This mechanism includes the total shafts and their associated mechanism. Since there are two sets of totalizers, two sets of timing control mechanisms are necessary. In the present instance, the front totalizers are used for group totals and the rear totalizers are used for grand totals. Hereinafter, these mechanisms will be referred to as total and grand total mechanisms, and the front totalizer will be called the totalizer, while the rear totalizer will be called the grand totalizer.

The mechanism for the timing control of the total and grand total shafts is shown in Figs. 1, 3, 5, 6, 8 and 10, and consists of cam 140, follower 260, lever 261, spring 262, arm 263, T-headed link 264, lug 266, spring 267, shaft 268, link 269, arm 270, total shaft 271, arm 272, lug 273, link 274, arm 275, and grand total shaft 276. Cam 140 is mounted on shaft 115 of the automatic totaling mechanism and follower 260 and lever 261 are kept in contact therewith by spring 262 associated with arm 263. T-headed link 264 is pinned at its lower end to the forwardly extending arm of lever 261, while its T-shaped upper end 265 is supported by a lug 266 on the side of arm 263, being kept in contact therewith by spring 267. Pivoted to arm 263 which is journaled on shaft 268, is link 269, the upper end of which is pivoted to arm 270 fixedly attached to total shaft 271. Journaled on shaft 268 and lying parallel to arm 263 (beyond it in Fig. 1) is grand total arm 272, on the forward end of which is lug 273 and upon which is pivoted link 274. The upper end of link 274 is pivoted to arm 275 which is fixed to grand total shaft 276.

The operation of the mechanism for actuating total shaft 271 is as follows:

When cam 140 turns, during the operation of the total taking control mechanism, lever 261 is turned counter clockwise, pulling link 264 downwardly and rocking arm 263 by means of a lug 266 on the side of the said arm. Also, this motion causes link 269 to be drawn downwardly, thereby rocking total shaft 271.

Mechanism, which is associated with that above described, is provided for actuating the grand total shaft 276. This mechanism consists of wire 280, arm 281, shaft 282, arm 283, link 284, screw 285, pin 286, arm 287 and spring 267. Wire 280 is pivoted on the rearward end of arm 281, which is fixed to shaft 282. Arm 283 also is fixed to shaft 282 and extends upwardly to contact the rearwardly extending forked end of link 284, which is pivotally attached to T-headed link 264 by screw 285 and is held in correct position by a pin 286 in the downwardly extending arm 287 of link 284 and spring 267. Shaft 282 and arms 281 and 283 are mounted on the front frame of the translator 160.

The operation of this mechanism for actuating grand total shaft 276 is as follows:

When a grand total perforation is sensed by pin 79, wire 280 is elevated, rocking arm 281, shaft 282 and arm 283 counter clockwise, as viewed in Fig. 1. Link 284 is forced forwardly, against the restraining influence of spring 267, thereby rocking link 264 until head 265 lies above the lug 273 on the side of arm 272. Turning of cam 140 thus causes link 264 to pull link 274 downwardly and rock grand total shaft 276.

*Control mechanisms*

Mechanism under control of total shafts 271 is provided for:
1. Changing the time of the totalizers.
2. Depressing the zero stop of the units in which totals are to be taken.
3. Setting the slam preventing mechanism.
4. Unlocking the printing hammers associated with the unit in which totals are taken.
5. Feeding the paper to the correct line.
6. Releasing the non-adding mechanism.

The operations above listed occur during the taking of a total and resetting of the machine.

*Change of totalizer timing—Figures 1, 5, 6, and 10*

Mechanisms are provided for changing the timing of both the totalizers 210 and the grand totalizers 215.

The mechanism for changing the timing of the totalizers 210 is similar to that shown in the cited Powers Patent No. 1,245,502, and in Figs. 1, 5, 6, and 10, herein.

The operation of this mechanism is as follows:

When total shaft 271 is rocked during a total taking operation, it forces pin 291 which extends laterally from the side of arm 292 to move bell crank 293 clockwise as viewed in Fig. 1. Link 294 is lowered and the lower notch in link 243 engages the lower pin 246 on rocker 242. Hence, when fan cam 190 moves forwardly, rocker shaft 241 and rocker 242 are turned clockwise, link 243 and camming arms 245 are pulled forwardly, and accumulator wheels 211 are brought into contact with actuators 166 at a time when said actuators are in condition for being advanced. Hence, the amounts standing on said accumulator wheels 211 will be set up in printing position on type carriers 167 for a total printing.

For taking grand totals, means are provided to control the timing mechanism of the rear totalizer to cause the engagement of wheels 220 and racks 218 prior to the forward movement of the racks, and the disengagement of the wheels prior to the return of the racks. For this purpose, an arm 300 (Fig. 5) is fixed to grand total shaft 276 and is provided with a stud 301 overlying the forward end of link 257.

When a grand total is to be taken, the total taking control mechanism operates as described above to effect first a spacing cycle, second, a total taking cycle in which the grand total is taken from the rear wheels, and, third, a normalizing cycle in which the control mechanism is restored to its original position. During the spacing cycle, although no stops 165 are rendered effective and, therefore, the actuating racks are not moved, the several mechanisms operate in the same manner as during accumulating cycles, i. e., wheels 220 are disengaged during the period in which racks 218 ordinarily move forward and are engaged during the period in which the racks are ordinarily returned. Thus, at the end of the spacing cycle, wheels 220 are engaged with racks 218, and link 257 is in its forward position. When shaft 276 is rocked at the beginning of the grand total taking cycle, stud 301 on arm 300 depresses the forward end of link 257 against the tension of spring 460. This movement serves to disengage notch 259 from pin 255 on rocker 254 and urges the lower edge of link 257 against pin 256, thereby rocking latch 462 slightly clockwise. As fan cam 250 moves forwardly during the first half of the grand total taking cycle, it operates wiper 251 and rocks rocker 254 clockwise. However, since pin 255 is out of engagement with notch 259, no movement is imparted to link 257. Therefore, wheels 220 remain engaged during the forward movement of the racks and the amount registered by the wheels is rolled out and printed on the report sheet. During this clockwise movement of rocker 254, pin 256 slides along the lower edge of link 257 and passes beyond the forward end of latch 462, thereby permitting the latch to be rocked counterclockwise by spring 460 and to form a projection on the lower edge of the link. In the second half of the grand total taking cycle, the initial rearward movement of fan cam 250 rocks rocker 254 counter-clockwise and forces pin 256 against the forward edge of latch 462 and thereby serves to shift link 257 rearwardly to cause the disengagement of wheels 220 prior to the return movement of racks 218.

*Zero stop retract mechanism—Figures 4, 5, 6, and 10*

Figure 4:
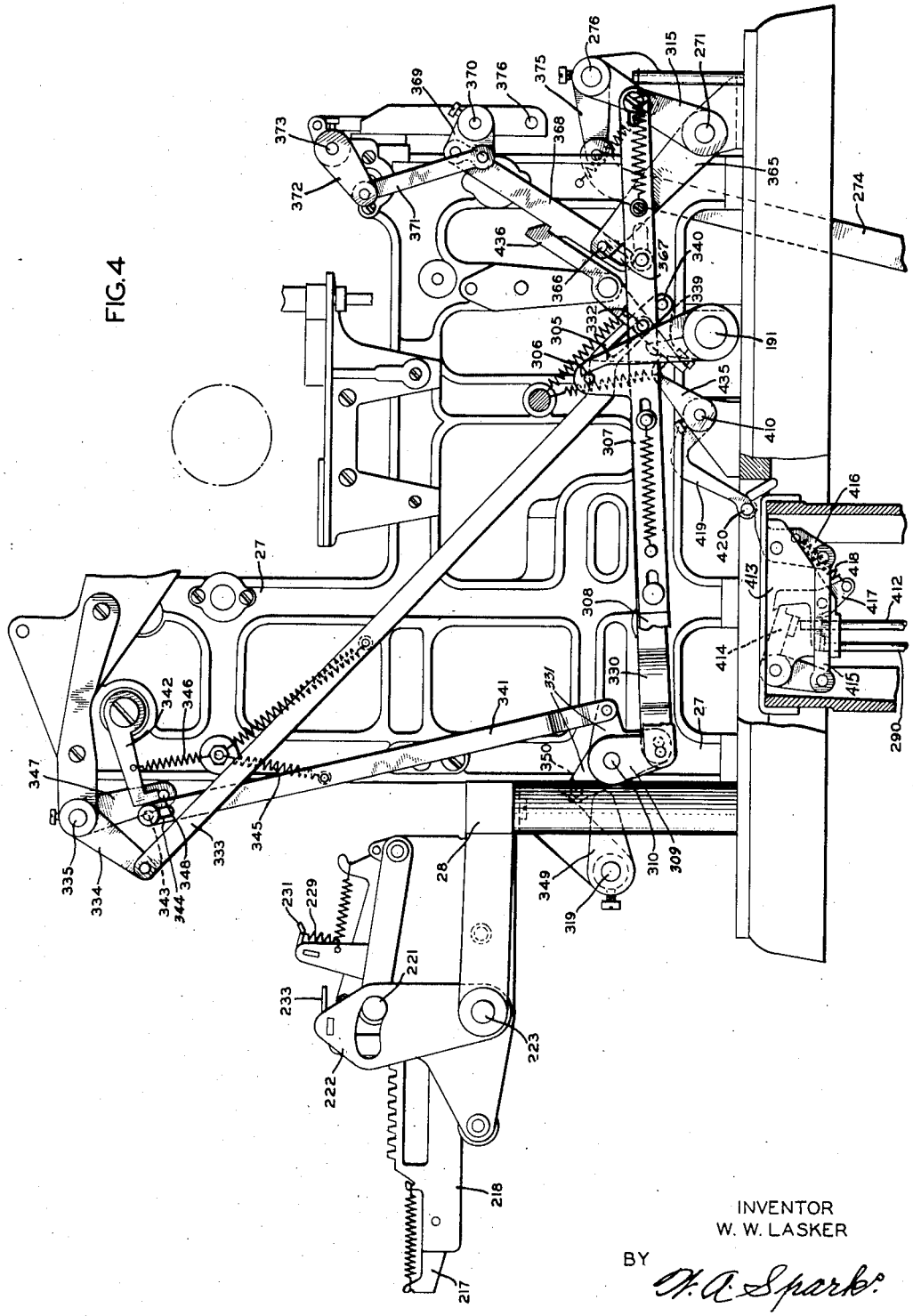
Fig. 4 is a left-hand side elevation of part of the head section showing the elements involved in the practice of the present invention.

Improved mechanism is provided for controlling the zero stop retraction to remove the load which retraction of the stops by a significant digit stop places on the interpreters. This mechanism is shown in Figs. 1, 4, and 10, and consists of arm 305, pin 306, slide 307, link 308, arm 309, shaft 310, bails 311, arms 312, pin 313 and bails 314. Arm 305 is fixedly mounted on shaft 191. Pin 306 extends laterally from the side of the upwardly extending portion of slide 307, which is resiliently mounted on the side of link 308 by a spring and pins in slots. The rearward end of link 308 is pivotally connected to arm 309 which is fast on shaft 310. Upon shaft 310 there are fixed zero stop retract bails 311 and arms 312. Bails 314 are journaled on shaft 319 and so positioned thereon that pin 313, fixed to the side of arm 312, overlies bail 314. A bail 311 or 314 is associated with each computing unit and overlies rearward extensions on the zero stops 169 of the unit so that the zero stops are retracted when shaft 310 is rocked clockwise (Fig. 4, counter-clockwise in Fig. 1).

The construction is such that during the latter part of each machine cycle, the last portion of the counter-clockwise movement of shaft 191 urges arm 305 against pin 306 (as in Fig. 4) to move slide 307 and link 308 rearwardly, thereby rocking shaft 310 clockwise to retract zero stops 169. By this arrangement the zero stops are depressed during the period in which the digit stops are elevated (see also Fig. 15), the digit stops serving merely to cam slides 168 (Fig. 1) rearwardly. In the meantime, the type carriers 167 are held in their rearmost position by the associated restoring bails 178.

As shaft 191 begins its clockwise movement during the next cycle, arm 305 is withdrawn from pin 306 and the spring on link 308 restores shaft 310 to its former position, to release zero stops 169, prior to the forward movement of the type carriers. Thus, in the columns in which no digit stop has been raised, the zero stop 169 is elevated by its spring to hold the associated type carrier in its rearward position; whereas, in the columns in which a digit stop has been raised, the cam slide 168, which is held rearwardly by the elevated digit stop, retains the zero stop in its lower position, thereby permitting the advance of the type carrier.

*Control of zero stop—Figures 4, 5, 6 and 10*

Mechanism is provided for causing the retraction of zero stops in those stop baskets that are associated with computing units in which totals and/or grand totals are to be taken. Since zero stops are normally in position to block the advance of actuators 166, and type carriers 167, it is necessary that these stops be depressed to permit the setting of the total by the type carriers. This mechanism may be divided into two groups, i. e., that associated with totals and that associated with grand totals. The mechanism of the former is shown in Figs. 4, 6 and 10, and consists of total shaft 271, arm 315, link 308, arm 309, shaft 310, bails 311. The mechanism of the latter is shown in Figs. 5, 6, and 10 and consists of shaft 276, arm 316, link 317, arm 318, shaft 319, arms 320, stud 321, pins 322 and bails 314. Arm 315 is fixed to shaft 271 at its left end (Fig. 4) and to it is pivoted the forward end of link 308. Arm 316 is fixed to shaft 276 near its right end (Fig. 5) and extends downwardly therefrom. Link 317 is pivoted at its forward end to arm 316 and at its rearward end to arm 318 which is fixed to shaft 319. Fixed to shaft 319 are arms 320 (Fig. 10) which carry studs 321 underlying pins 322 fixed to zero release bails 314 which are loosely mounted on shaft 310.

The operation of the mechanism associated with totals is as follows:

When cam 140 initiates a total operation, shaft 271 is rocked counter clockwise as viewed in Fig. 4, and arm 315, link 308, and arm 309 are forced rearwardly, rocking shaft 310 clockwise and depressing bails 311 and arms 312, pin 313 and bails 314 to retract all zero stops 169.

The operation of the mechanism associated with grand totals is as follows:

When grand total shaft 276 is rocked clockwise, as viewed in Fig. 5, the fixed arm 316, mounted thereon, draws link 317 forwardly to rock shaft 319 clockwise through an arm 318. Rocking shaft 319 will cause studs 321 on arms 320 to raise pins 322 on bails 314 to rock them downwardly.

Hence, when a grand total is effected, only zero release bails 314 will be actuated.

Figure 11:
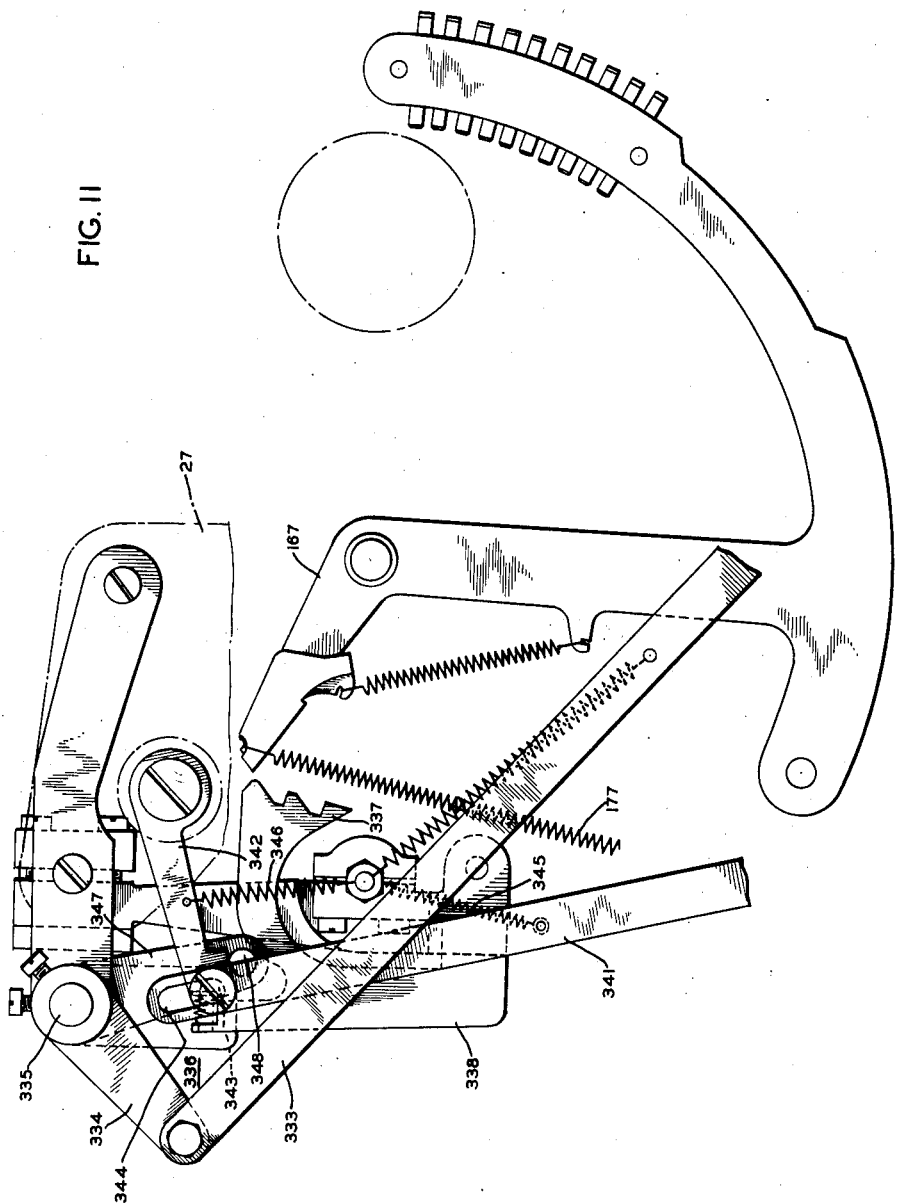
Fig. 11 is a diagrammatic elevation of the slam checking control mechanism.

*Slam checking mechanism—Figures 4, 10 and 11*

Mechanism is provided for preventing the slamming of the actuators and type carriers caused by the influence of spring 177, when the accumulator wheels are withdrawn from the actuators at the approximate middle of a total cycle. This mechanism is shown in Figs. 4, 10 and 11, and consists of link 330, plate 331, stud 332, link 333, arm 334, shaft 335, bail assembly 336, pawls 337, supporting block 338, arm 339, pin 340 and shaft 191. Attached to link 308 by a pin in slot connection is a link 330 extending parallel to link 308 and pivoted at its rearward end to a three armed plate 331 which is journaled on shaft 310. A stud 332 located in the side of link 330 supports the lower end of link 333 which extends upwardly and rearwardly to its pivot on arm 334. Arm 334 is fixed to shaft 335, which is journaled in suitable brackets attached to the machine. Shaft 335 supports a bail assembly 336 (Fig. 11) for each computing unit. Pawls 337 which are the slam checking instrumentality are pivoted at their lower ends in supporting block 338. The upper ends of these pawls are guided in the comb-shaped bar of bail assembly 336, and are held in place by small springs which extend from the bail bar to each pawl. An arm 339 is fixed to the left end of shaft 191 and is capable of cooperation with pin 340 mounted in the end of link 333.

The operation of this mechanism is as follows:

When total shaft 271 is rocked, link 308 is forced rearwardly, bringing pin 340 into the path of arm 339. The oscillation of shaft 191 will cause arm 339 to engage pin 340 at or near the end of the first half of the total yielding cycle, pulling link 333 downwardly, and rocking shaft 335 counter-clockwise, as viewed in Fig. 11. This motion swings the bail assembly 336 forwardly, causing pawls 337 also to move forwardly into the path of the rearwardly extending ends of type carriers 167. The teeth on pawl 337 are designed to check properly the slamming tendency of type carriers 167 regardless of the position of said type carriers.

Mechanism is provided for locking the slam checking mechanism in effective position during the period when its effectiveness is desired. This mechanism is illustrated in Figs. 4 and 11, and consists of link 330, three-armed plate 331, link 341, latch 342, pin 343, slot 344, springs 345 and 346, arm 347, and pin 348. Link 341 is pivoted at its lower end on member 331 and at its upper end is connected to latch 342 by a pin 343 fixed thereto in slot 344 and is urged upwardly by spring 345. Latch 342 is journaled on a screw in end frame 27 and is retained in position to be effective by spring 346. Arm 347 is fixedly attached to shaft 335 and carries pin 348.

The slam check mechanism lock operates as follows:

When shaft 271 rocks rearwardly, link 330 is forced rearwardly causing three-armed plate 331 to rock counter-clockwise about shaft 310, as viewed in Fig. 4 and pull link 341 downwardly. The downward motion of link 341 removes the restraining influence of slot 344 on pin 343 and renders latch 342 free to engage pin 348, when it rocks forwardly under the action of shaft 335. When shaft 271 returns to normal, link 341 moves upwardly and causes latch 342 to release pin 348, thereby permitting bails 336 and slam checking pawls 337 to return to normal.

When shaft 319 is rocked counter-clockwise (in Fig. 4) during a grand total operation, arm 349 fixedly mounted on shaft 319 co-acts with pin 350 fixed to plate 331 to continue latch 342 in effective position. The pin in slot connection between link 308 and link 330 prevents movement of link 308 when shaft 319 is rocked during a grand total operation.

*Printing hammers—Figures 1 and 7*

The printing mechanism is disclosed in the cited patent to Lasker No. 1,253,696, and is illustrated in Figs. 1 and 7 of the present application.

As viewed in Fig. 7, the operation of the printing hammer mechanism is as follows:

When type carriers 181 advance, lever 355 is rocked counter-clockwise by the action of the cam surface on said carriers. This motion will elevate the rearward ends of interponents 356 against the tension of spring 357, into the path of bail 358. A crank 359 on shaft 360 will, at the proper time, rock bail 358 clockwise and force interponents 356 forwardly, thus rocking latches 361 and releasing hammers 362. Hammers 362 are urged upwardly by tensioned springs 363, and a percussive blow is struck upon the type slugs, which, since the inked ribbon is interposed between them and the paper, will cause a printed impression to be made. After printing occurs, bail 358 will be rocked in the opposite direction. During this motion the projections at the rearward end of hammers 362 are contacted by bail 358, which continues to rock until latches 361 have engaged the projections on the forward ends of hammers 362. Similar mechanism for numerical units is shown in fragmentary form in Figs. 1 and 8.

A projection, which extends laterally to the right, is provided on the bottom of each interponent, except that associated with the lowest denominational order, to lift the interponent of the next lower order and insure printing of zeros. Occasionally it is desired to split a hammer unit so that a broad unit may serve as two or more narrow ones. For this purpose, each interponent is provided with two indentations, which serve as detent notches for a manually adjustable rider. When this rider is in its forward position, the lateral projection of the next higher order interponent is non-effective. However, when the rider is in its rearward position, the elevation of an interponent of the next higher order will cause its projection to strike the associated rider and elevate the interponent to which said rider is attached.

Interponents, which are associated with alphabetic printing, are not provided with lateral projections.

*Printing hammer locking mechanism—Figures 1, 4, 6, 7, 8, and 13*

Mechanism is provided for locking the printing hammers, which are associated with each computing unit, and for controlling the functioning of these locks according to the form of the report, which is being tabulated. It may be that some items are to be entered in certain predetermined columns and other items in other predetermined columns; hence, printing will be desired only in the columns in which entry is desired. Mechanism for the above purpose will be called the non-print device.

This mechanism is illustrated in Figs. 1, 4, 6, 7, 8 and 13 and is divided into groups according to the column determination above. The mechanism for the first group consists of arm 365 (Figs. 4 and 8), pin 366, slot 367, link 368, plate 369, shaft 370, link 371, arm 372, shaft 373, and non-print bails 374. Arm 365 is fixedly mounted on shaft 271 and a pin 366 in its rearward end engages a slot 367 in the rearward end of link 368. The forward end of link 368 is pivoted to plate 369, which is fixed to shaft 370, and has pivoted on it also, the lower end of link 371. The upper end of link 371 is pivoted on arm 372, which is fixedly mounted on shaft 373 on which non-print bails 374 are fixedly mounted. In Fig. 8, the mechanism is shown in the position attained at the end of a total taking operation.

The operation of the first group non-print device is as follows:

When total shaft 271 is rocked during a total taking operation, arm 365 is turned clockwise (Fig. 8) and the pin 366 pulls link 368, thereby rotating plate 369 about its pivot and pulling link 371 downwardly. The downward motion of link 371 rocks arm 372, bail shaft 373 and bails 374 clockwise to the position shown in Figs. 1 and 8, at which time the downwardly extending lip of bail 374 will be out of the path of the forwardly extending projections on hammers 362 and said hammers will be free to swing, when released by latches 361.

The mechanism of the second group of the non-print device consists of jack shaft 376, arms 377 and 378, non-print bails 379 and 380 and links 381. Jack shaft 376 is journaled in brackets attached to frames 27. Upon it are mounted arms 377 and 378, there being one arm 377 for the assembly and an arm 378 for each bail 379 and 380. Non-print bails 379 and 380 are pivotally mounted on shaft 373 and are connected to their respective arms 378 by links 381.

The operation of this mechanism is as follows:

When arm 377 is moved clockwise by means which will be described hereinafter, jack shaft 376 and arms 378 will be rocked clockwise as viewed in Fig. 8. This motion will lower link 381 causing a counter-clockwise turning of non-print bails 379 and 380 and moving their respective lips into the path of print hammers 362.

*Paper support and feed—Figure 1*

Mechanism is provided for supporting and feeding the paper upon which the record is to be printed. The mechanism of these means is substantially that disclosed in patent to Lasker and Mueller No. 1,627,394, dated May 3, 1927.

*Line space lock—Figure 5*

Figure 14:
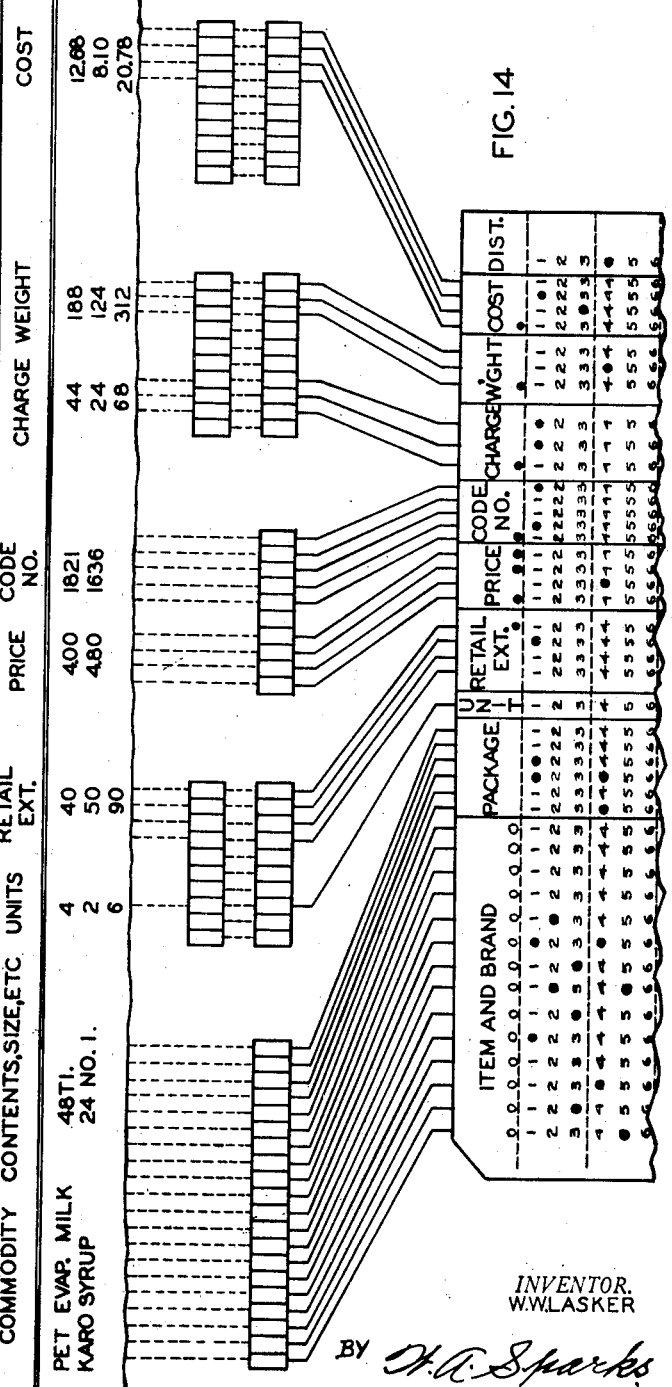
Fig. 14 is a diagram showing a typical card and the type of report compiled by the mechanism of the present invention.

Mechanism is provided to prevent the feeding of paper when the machine is set for printing totals only. One of many uses of this feature is found in the production of a summary such as is illustrated in Fig. 14. This mechanism is shown in Fig. 5, and consists of arm 385, link 386, slide 387, spring 388, bell crank 389 and cam 390. Arm 385 is fixedly attached to shaft 373 and has pivoted at its end an extensible link 386 which carries at its lower end a slide 387, which is urged upwardly by spring 388. Adjacent slide 387 is bell crank 389, the upwardly extending arm of which is pivotally connected to mechanism for operating the line spacing mechanism. The rearwardly extending arm of bell crank 389 carries a roller which is so situated as to be contacted by the forwardly extending portion of cam 390, which is fixed to shaft 191.

The operation of the line space lock is as follows: Following the taking of a total, the paper is advanced one space and the designatory matter of the first card of the next group is printed. Thereafter, there should be no feeding of paper until after the next total is taken. Hence, when non-print bails 374 are restored to locking position, arm 385 elevates link 386, and thereby slide 387 is conditioned to move upwardly under the influence of spring 388. Cam 390 being rocked clockwise during the second half of the cycle of shaft 191, as viewed in Fig. 5 rocks bell crank 389 to a position where slide 387 is free to snap in front of the shoulder on the bottom of said bell crank. Bell crank 389 and mechanism controlled thereby are then locked against operation until such time as the non-print bails are again rendered ineffective. Thereupon, arm 385 forces link 386 downwardly to remove slide 387 from contact with bell crank 389 and thereby permit cam 390 to cause the actuation of the line space mechanism.

*Segregating front from rear totalizers—Figures 1, 5 and 10*

Mechanism is provided for shifting either the front or the rear totalizers to non-add position, when totals are being taken from the other. Failure to do so would result in clearing the grand totalizers when group totals are taken and in rolling amounts into the group totalizers when grand totals are taken. Either of these would not be desirable. The mechanism for this purpose is shown in Figs. 1 and 5 and consists of crank 400, arm 401, shaft 402, arms 403, pin 404, levers 293 and links 294 for controlling the front totalizers and crank 405 and link 406 for controlling the rear totalizers.

Crank 400 is fixedly attached to the end of front grand total shaft 276. Upon crank 400 is mounted a follower which is positioned to contact the spring restrained arm 401, which is fixedly attached to shaft 402. Arms 403, one for each unit equipped with both front and rear totalizers, are fixed to shaft 402. The operation of this mechanism is as follows:

When shaft 276 is rocked, crank 400 is pressed against arm 401, moving it downwardly and into the path of pin 404, which extends laterally from fan cam 250. The forward motion of fan cam 250 causes shaft 402 and arms 403 to rock, by reason of the pressure of pin 404, upon arm 401. Arms 403 are thus rocked against the upwardly extending arm of bell crank 293, which is thereby constrained to rock, pulling links 294 downwardly and positioning link 243 midway between pins 244 and 246. Hence, oscillation of rocker 242 will have no effect on accumulators 211 during a grand total operation.

Crank 405 is fixedly mounted on shaft 310 and link 406 is connected thereto by a spring and by a pin-in-slot connection to link 257. The operation of this mechanism is as follows: When shaft 310 is oscillated, crank 405 pulls link 406 downwardly. This motion of link 406 removes link 257 (Figs. 5 and 10) from engagement with pin 255 and to a position such that rocker 254 will have no effect on said link. Hence, accumulators 220 will not be brought into engagement with their racks 218 during a total operation.

Non-add mechanism—Figures 4 and 8

Mechanism is provided for effecting non-adding in certain predetermined totalizers when summary reports are being produced. The mechanism of these means comprises non-add shaft 410, non-add slides 411 and associated control mechanism. This control mechanism is:

1. Card control of non-add shaft.
2. Control of non-add slides by non-add shaft.
3. Setting of non-print bails by non-add slides.
4. Releasing other non-print bails.

The mechanism for card control of non-add shaft 410 is shown in Figs. 4 and 8, and consists of interpreter wire 412, bracket 413, bell crank 414, link 415, cam lever 416, latch 417, spring 418, arm 419 and pin 420. Interpreter wire 412 has its ends guided respectively by the bottom plate of the translator 160 and by a bracket 413 mounted between the front and rear frames of translator 160. Bell crank 414 is journaled on a stud in bracket 413 and its downwardly extending arm is pivotally connected to the rearward end of link 415. Cam lever 416 also is journaled on a stud in bracket 413 and is pivoted to the forward end of link 415. Latch 417 is journaled on bracket 413 and is connected by a tension spring 418 to cam lever 416. An arm 419 fixed on non-add shaft 410 carries a pin 420 which is maintained in cooperative relation with cam lever 416 by the spring of the mechanism it controls.

The operation of the above mechanism is as follows: A special perforation in a card will permit the corresponding sensing pin 79 to cause the elevation of interpreter wire 412. The elevation of this wire rocks bell crank 414, which moves link 415 forwardly, thus rocking cam lever 416. Arm 419 is turned in a counter clockwise direction, as viewed in Fig. 8, by the rocking of cam lever 416, thereby rocking non-add shaft 410 counter clockwise. Spring 418 causes latch 417 to snap under bell crank 414 and hold shaft 410 in effective position until release is effected by the operation of interpreter 290.

Figure 12:
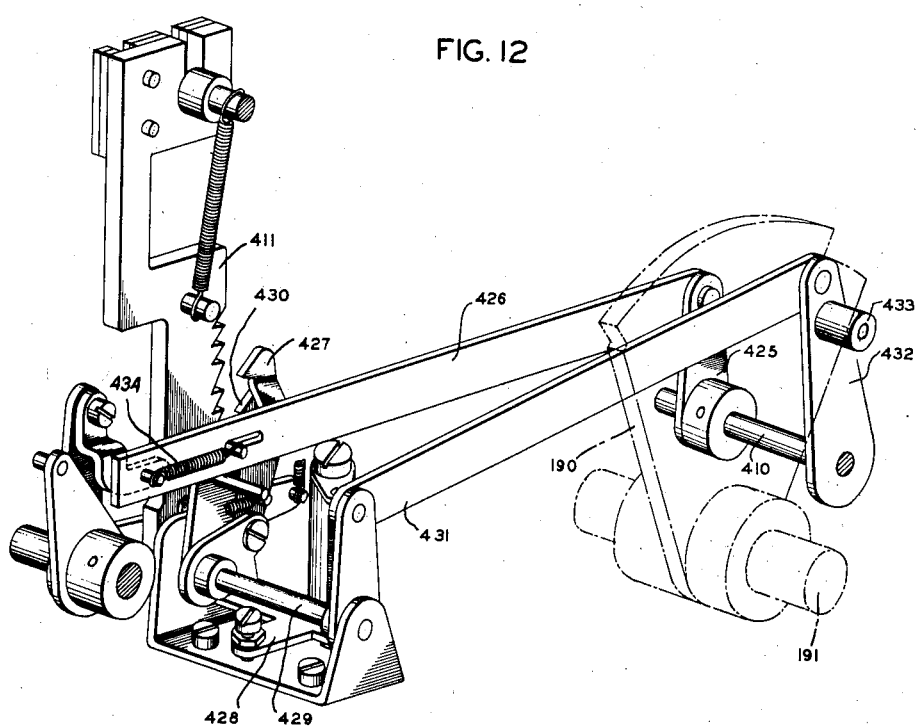
Fig. 12 is an isometric view of a portion of the mechanism of Fig. 8.
Figure 13:
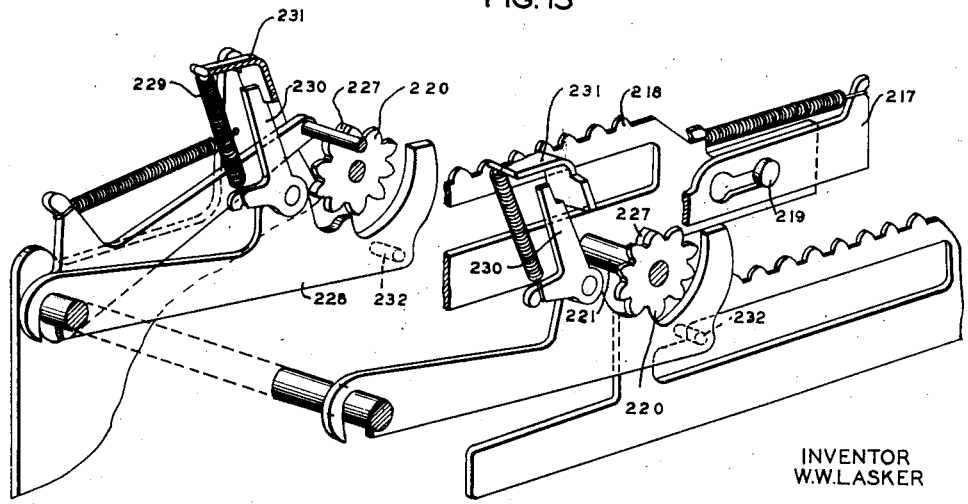
Fig. 13 is a fragmentary isometric showing of parts of a rear totalizer unit.

The mechanism by which non-add slides 411 are controlled by non-add shaft 410 is shown in Figs. 8 and 12. In the prior art non-add sides were controlled manually and were shifted at the end of the forward travel of fan cam 191 (patent to Lasker No. 1,388,271, dated August 23, 1921). In the improvements embodied in the present invention, shifting occurs at the end of the rearward travel of said cam and is automatically controlled. The mechanism consists of arm 425, link 426, holding pawl 427, rocking frame 428, shaft 429, feeding pawl 430, link 431, arm 432, pin 433 and shaft 410.

Arm 425 is fixedly mounted on shaft 410 and has the rearward end of link 426 pivoted thereto. The forward end of link 426 is attached to holding pawl 427 by a spring and pin-in-slot connection. Holding pawl 427 and rocking frame 428 are journaled on shaft 429. One arm of rocking frame 428 pivotally supports feeding pawl 430 and the other arm pivotally supports the forward end of link 431. The rearward end of link 431 is pivoted to arm 432, which is pivotally mounted on shaft 410 and is provided with a laterally extending pin 433 that lies in the path of movement of fan cam 190.

The operation of the mechanism for controlling non-add slides 411 by non-add shaft 410 is as follows: Shaft 410 having been rocked counter clockwise as the result of elevating wire 412, link 426 is moved forwardly tensioning spring 434 and moving holding pawl 427 into contact with teeth on slide 411. Pawls 427 and 430 are placed in tandem relation to each other and each is offset near its top. Hence, when pawl 427 is brought into contact with slide 411, spring pulled feeding pawl 430 will also be brought into contact with said slide 411. Each oscillation of shaft 191 will cause cam 190 to strike pin 433. Arm 432 and link 431 will then be moved rearwardly, thereby oscillating rocking frame 428, which will then cause pawl 430 to pull slide 411 downwardly one notch per cycle of shaft 191, until it has reached its limit of travel. Thereafter, pawl 427 will be effective until released and feeding pawl 430 will move idly.

In tabulating machines of this type, arranged according to the disclosure in Patent No. 2,044,119, a card is passed into the sensing chamber and sensed during the period in which the mechanism in the head section is operating under control of the preceding card. The timing of the several mechanisms is such that, when the interpreter wires are elevated by the sensing pins, they reach their effective positions before cams 190 reach their rearmost position. Thus, when a control card Fig. 9), having a special perforation arranged to effect the elevation of interpreter 412, is sensed, shaft 410 (Fig. 8) is rocked to engage pawls 427 and 430 with slide 411 before cam 190 rocks arm 432 clockwise. Then, when cam 190 is returned to its rearmost position at the end of the operation of the head mechanism controlled by the preceding card, it operates arm 432 and the associated mechanism to pull slide 411 downwardly one step. In the same manner, slide 411 is pulled downwardly a second step at the end of the operation controlled by the control card. And, finally, slide 411 is pulled downwardly a third step at the end of the operation controlled by the first card of the group of item cards that follow the control card. The arrangement of teeth on slide 411 is such that pawl 430 cannot engage with a new tooth after the third step. During the tabulation of the remaining cards of the group, pawl 427 holds slide 411 depressed against the tension of its spring.

The movement of slide 411 is utilized to rock bails 379 and 380 to effective position to block printing in the designating units after the group designation has been printed from the first card of the group. For this purpose, arm 377 (of linkage 376, 377, 378 and 381, described hereinabove under "Printing hammer locking mechanism") is provided with a stud that extends into the path of movement of a shoulder on slide 411, and is arranged to be depressed by the shoulder when slide 411 is moved downwardly the third step; arm 377 is set to provide a lost motion conection between slide 411 and bails 379 and 380 during the first two steps of the slide. Thus, bails 379 and 380, which are resiliently urged to open position by a spring on shaft 376 (Fig. 6), remain open during the blank operation initiated by the control card. And, also, remain open during the tabulating operation initiated by the first item card of the group, thereby permitting the printing hammers to operate in the usual manner to effect printing of the group designation from the first card. At the end of the first tabulating operation, however, slide 411 is depressed the third step and rocks arm 377 clockwise. This movement, by means of shaft 376, arms 378 and links 381, rocks bails 379 and 380 counter-clockwise to their effective or closed position to prevent printing in the designating units. Since pawl 427 holds slide 411 depressed, the bails remain effective to prevent designation printing from the remaining cards of the group. This condition is maintained until the totals of the quantitative data on the group of cards are taken.

When the total of a group of cards is taken, shaft 410 is restored to its original position to condition the mechanism associated therewith for either of three types of operation that may follow, namely, (1) a conditioning operation under the control of a control card to set the machine for the tabulation of the next group of item cards, (2) a grand total operation under the control of a grand total card, or (3) a tabulating operation under the control of an item card when a single item card constitutes the succeeding group.

Figure 9:
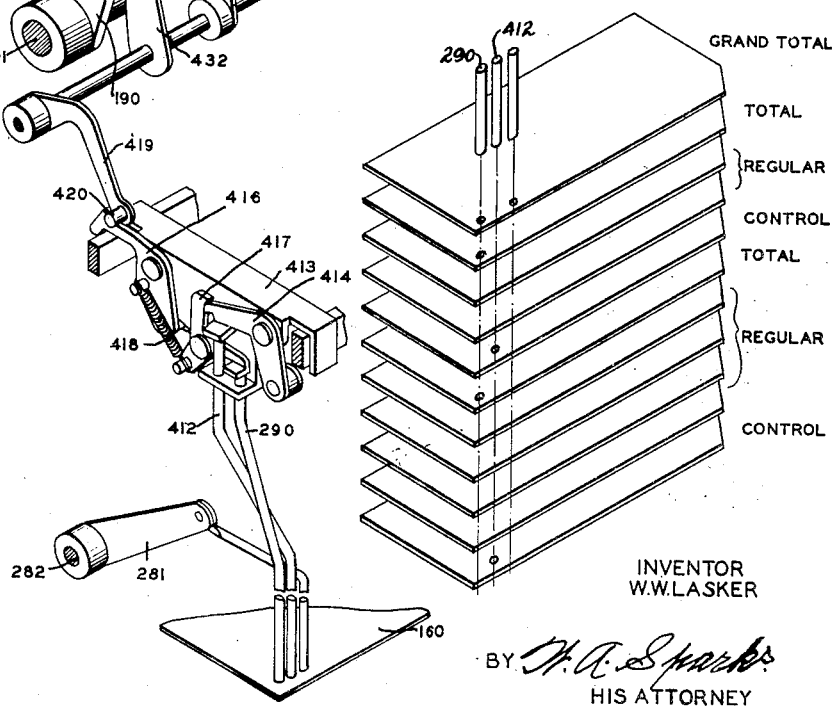
Fig. 9 is an isometric diagrammatic representation of a pack of cards typical of those used in the practice of the invention.

In the arrangement shown herein, the group totaling operation is initiated by a total card (Fig. 9) that is blank except for a single perforation that is usually in the "12" position of the forty-fifth column as shown in Fig. 9. When this card is sensed, the sensing pin that passes through the special perforation causes the total taking control mechanism of Fig. 3 to be tripped, to cause the machine to perform a totaling operation comprising a conditioning cycle, a total taking cycle, and a blank cycle, during three cycles of machine operation, in the manner disclosed in Patent No. 2,044,119. This sensing pin is also arranged to elevate an interpreter 299 (Fig. 8) mounted in translator 160, which rocks latch 417 counter-clockwise to release bellcrank 414. The spring connecting arm 435 to the frame of the machine is then free to rock shaft 410 clockwise and return arm 419, cam lever 416, link 415, bellcrank 414, spring 418 and latch 417 to their original positions as shown in Fig. 8. This motion of shaft 410, by means of arm 425, pulls link 426 rearwardly to disengage pawls 427 and 430 from slide 411 to allow the slide to be pulled upwardly by its spring, thereby releasing arm 377. Shaft 376 is then free to be rocked counter-clockwise by its spring (Fig. 6) and, in turn, by means of arms 378 (Fig. 8) and links 381, rocks non-print bails 379 and 380 of the designating units clockwise to their open or ineffective position. These bails remain in this position until shaft 410 is again rocked counter-clockwise when a control card is sensed. The above mentioned clockwise rocking of shaft 410 also raises arm 435 from latch 436 and allows the forward end of the latch to rest upon link 368. Thus, when shaft 271 is rocked during the total taking cycle, and pin 366 in arm 365 pulls link 368 downwardly to rotate plate 369 clockwise and thereby rock bails 374 of the computing units clockwise to permit printing of totals, latch 436 engages the shoulder on link 368 and retains bails 374 in their open position. This condition continues during the total taking cycle and until just before the end of the blank cycle following the total cycle. Then, if the next card is a control card as in type 1, above, having a perforation arranged to effect the elevation of interpreter 412, shaft 410 is rocked. This movement, by means of arm 435, releases latch 436 thereby allowing bails 374 to be closed under the action of a suitable spring to block printing in the computing units, and concomitantly, by means of arm 425 and link 426, engages pawls 427 and 430 with slide 411 to block printing in the designating units after the tabulation of the designation from the first card of the succeeding group of item cards.

If, however, a grand total card (Fig. 9) follows the group total card, as in type 2, above, interpreter 412 is not elevated to rock shaft 410 and a different condition prevails. To clearly bring out the manner of operation in this case, it should be stated that in the well known Powers tabulator, when total shaft 271 is rocked during a group total taking operation, bellcrank 293 is rocked and, by means of link 294, pulls link 243 downwardly to reverse the accumulating timing of totalizer 211, i. e., to engage the accumulator wheels 211 with actuating racks 166 (Fig. 1) on the forward stroke of the type carriers and disengage the wheels from the racks during the return of the type carriers. When shaft 271 is returned to normal position at the end of the total taking cycle, link 243 is resiliently returned to its accumulating position unless held by other means. In the present machine, the front totalizers are kept out of engagement with the associated actuating racks when grand totals are taken from the rear totalizers. For this purpose, a shaft 370 (Fig. 8) having plate 369 fixed thereto, is adapted to be rocked by link 368 during totaling operations. Also fixed to shaft 370 is an arm 440 that overlies a slide 441 which is provided with a shoulder adapted to engage a stud 442 that is fast to the forward end of link 243. The arrangement is such that, when shaft 370 is held rocked by latch 436, arm 440 holds slide 441 depressed sufficiently to hold link 243 in a neutral or non-add position when link 243 is released by bellcrank 293 at the end of the total taking cycle. In this position, neither pin on rocker 242 can engage with the notches on link 243, and as wheels 211 have been disengaged from their actuating racks during the latter part of the total taking cycle, this position is maintained until latch 436 is released by a control card. Thus, when a grand total card follows a total card, shaft 410 and latch 436 remain in the position shown in Fig. 8 and the amounts standing on the rear totalizer 215 are rolled out and printed on the report sheet, the front totalizer remaining in non-add position.

By means of the mechanism just described, a card group that comprises a single item card may be tabulated during a single cycle of machine operation. To accomplish this end, the control card and total card, respectively preceding and following the usual card group comprising more than one card, are omitted when one item card constitutes a group, and the single card follows immediately after the total card of the preceding group. At the end of the totaling operation for the preceding groups, the mechanism remains in the position shown in Fig. 8, i. e., latch 436 holds link 368 in its lower position which in turn serves to retain bails 374 in their open position and link 243 in non-add position, and pawls 427 and 430 are held disengaged from slide 411 so that bails 379 and 380 remain open. Since there is no special perforation in the item card to effect the elevation of interpreter 412, shaft 410 remains in the position shown. Thus, when the item card is sensed, the type carriers advance in accordance with the perforations therein and the printing hammers of all units are fired to effect printing of all designatory and numerical data on a single line of the report sheet. When the type carriers are returned the amounts thereon are rolled into the rear totalizers of the computing units and the machine remains conditioned for either of the three types of operation mentioned above that may follow.

Figure 15:
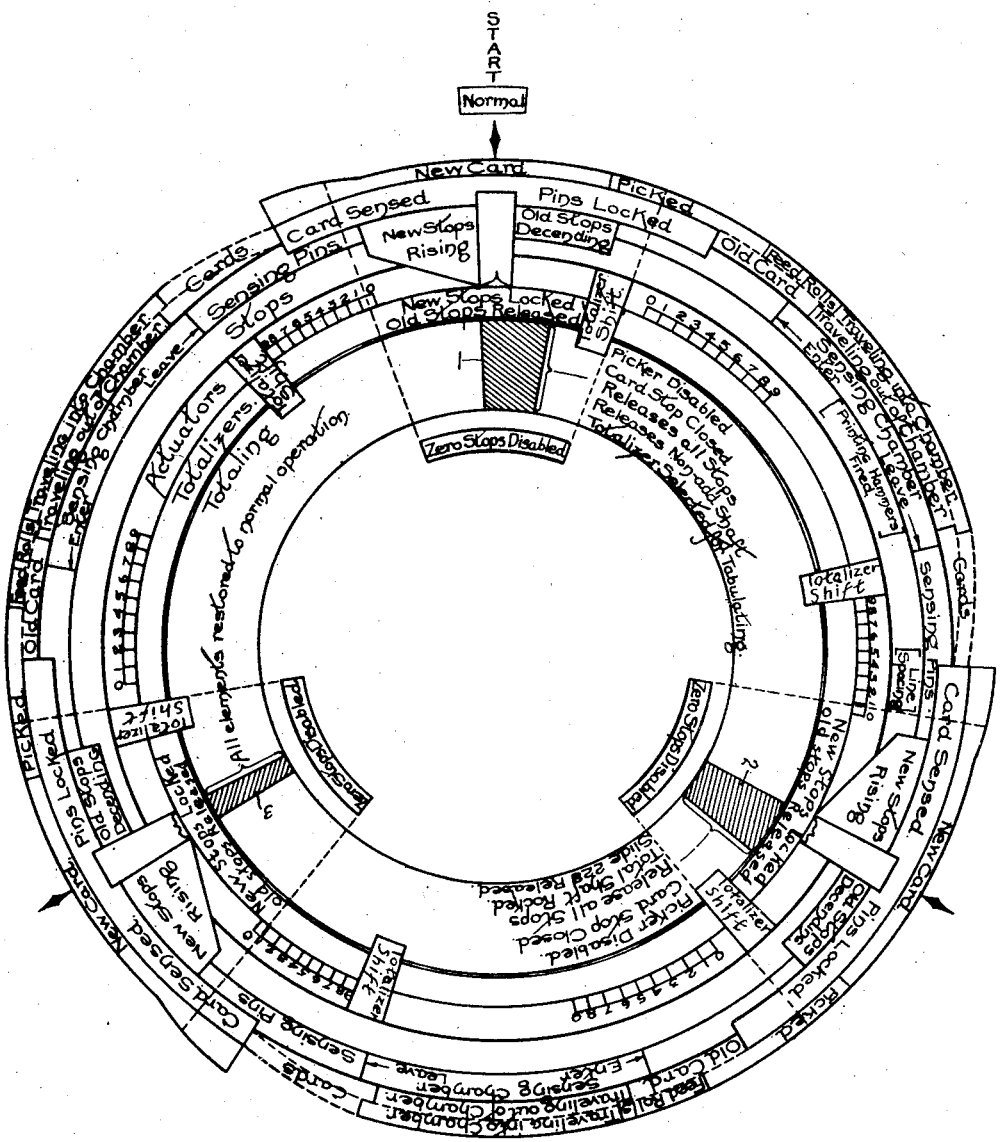
Fig. 15 is a diagram showing the timed relation between the principal instrumentalities.

*Timing diagram—Figure 15*

The timing relation between the various groups of mechanism, which comprise the machine, is shown in Fig. 15. Starting at the point indicated on the diagram as "normal" and turning the diagram laterally about its center, the various operations may be studied in relation to each other through three complete cycles of the machine. As soon as a card is sensed, it becomes, so far as the machine operation is concerned, an "old card". It will be seen that an appreciable time elapses between stopping a card in the sensing chamber and the contact of sensing pins therewith. This is the time required for the sensing pins 79 to contact record retaining pins 101.

The period for elevating a stop 165 is indicated by the sectors designated as "New stops rising". The period during which stops are locked in position, being held up by interpreters 161 and pins 101 and locked by slides 102, is indicated by the sector designated as "New stops locked, old stops released". The stops remain locked until a change occurs in the setting of the sensing pins. The period required for the old stops 165 to return to normal is indicated by the sector designated as "Old stops descending".

At approximately the same instant that the stops 165 reach their effective position, the accumulator wheels 211 and 220 are shifted out and the actuators 166 and type carriers 167 start their advance, as is indicated by the series of ascending digits. When the type carriers have reached the maximum travel permitted by the set stops 165, the printing hammers are released as indicated by the bracket "Printing hammers fired". Immediately after this has occurred the accumulator wheels 211 and 220 are shifted into engagement with actuators 166. Type carriers 167 and actuators 166 then return to normal as is indicated by the series of descending digits. The computing section is now conditioned for its next cycle. However, the mechanism of the base has already started on its second cycle. Hence, the computing head will start immediately on the sequence of operation associated with its second cycle.

The retraction of zero stops 169 occurs during the sensing period. The setting of mechanisms which are controlled by special perforations occurs during the period in which the "new" stops are rising. These mechanisms include that which selects the totalizers that are to yield totals, that which rocks the non-add shaft 410, and that which renders printing hammers ineffective.

During totaling, all operations associated with the tabulation of data are suspended by the action of total taking control mechanism, except those of yielding and printing totals. In totaling, a blank cycle occurs before the total cycle. During the blank cycle, mechanism is actuated which suspends certain operations. The accumulator wheels 211 are shifted into mesh with the actuators 166 at the moment when in accumulating they would have been withdrawn, the type carriers and actuators advance, printing occurs as previously indicated, and the accumulator wheels are withdrawn. The machine is now set for the next cycle.

If that cycle is a grand total, the events, described in the preceding paragraph, are repeated, except that accumulator wheels 220, instead of 211 are brought into mesh with their actuators.

If extra line spaces are desired before the printing of a grand-total, blank cards may be inserted, one for each line space.

*Summary of operation*

It was set forth in the objects of the invention that the machine herein described was capable of a variety of uses. To describe all of these would be in excess of the present disclosure. Therefore, only two forms of reports with their variations will be discussed namely "Detail tabulation" and "Summary" (see Fig. 14).

Let it be assumed that the tabulator is to be used in connection with the stock records of a chain grocery system. A report of the perpetual inventory of the various warehouses may be one of the reports produced on the tabulator. Each separate item of inventory will be represented by a perforated card. These items will be boxes of canned goods, boxes of dried fruits, crates of fresh fruits, sacks of potatoes, bundles of brooms, etc. A blank card will be perforated for each of the above units in accordance with some pre-arranged code, such as is shown in the fragment of a typical card in Fig. 14. When an order is received by the warehouse from one of the branches or sales points, a perforated card for each unit on the order is withdrawn from racks which are a permanent inventory file and tabulated to secure a report of the goods being shipped. These cards are then placed in other racks, which are the file of the inventory of the store. When the district supervisor's report of the fiscal inventory of this store is sent in, the cards are withdrawn from the file and a report is made up which may be utilized in determining the amount of cash which should have been received from the store manager during the period since the last fiscal inventory.

It is apparent that to repeat item after item of the same commodity would make a report which would be entirely too long and which would set forth needless information. Such a report is shown in Fig. 14 and is indicated by the caption "Detailed tabulation". This tabulation indicates quite clearly that the item of interest is the total of the four items of "milk" and the two items of "syrup". Hence, the machine is so designed that reports which give the descriptive matter and the total quantities are produced. Such a report is indicated also in Fig. 14 by the caption "Summary". Fig. 9 illustrates a stack of the cards necessary to produce the summary printing in Fig. 14. Some of the fields show information as to totals; others show only information as to character. Hence, the tabulator is so designed that the alphabetic unit and the computing units in which package, price and code number are imprinted, do not yield totals. Other units are equipped with total and grand-total units. The lower line of rectangles in Fig. 14, indicated by the caption "Totalizers" is a conventional showing of the units in which only one accumulator is present. The upper row of three totalizers is indicative of those units in which both front and rear, that is, total and grand total, units are present.

In preparing a report, care is taken that all cards of a single commodity are kept in one group, and that they are arranged in a fixed order. Starting at the bottom of the stack, since the bottom card is the first one to be fed into the sensing chamber the order of arrangement and brief statement of purpose is as follows:

1. Control card. This card causes setting of front wheel for adding and controls setting of non print bails to non-print in the adding columns.
2. Data cards. These cards contain information which is accumulated on both total and grand total accumulators but not printed in adding columns. (When a group consists of a single card, the card is placed immediately after the total card of the preceding group and is followed by the control card of the succeeding group.)
3. Total card. This is the last card of the group to be fed. It is placed on top of cards having a common designation. Initiates operation of total taking control mechanism and causes the front wheels only to yield totals. Also restores non-print and non-add device previously set by control card.
4. Control card. This is the first card of next group, otherwise as in number 1 above.
5. Data cards. Same as number 2 above.
6. Total card. Same as number 3 above.
7. Grand total card. This is the last card. Sets T link to position for grand total taking, and initiates the operation of the total taking control mechanism to effect the taking of the grand total.

The cards, after being assembled, are placed in magazine 46 (Fig. 1); the machine is started; the cards are fed singly from the bottom of the stack by picker 47; passed through throat knife 45 to feed rolls 32, which pass it onwardly into sensing chamber 75 where it is held by a card stop 70; sensing box 78 rises and certain sensing pins 79 find perforations in the card; sensing box 78 continues to rise; locking slides 80 secure the elevated pins 79 and reading retaining pins 101 are elevated, and latched by slides 102. Coincident with the elevation of the reading retaining pins 101, interpreters 161 and stops 165 are elevated, thereby conditioning the stop basket for setting type carriers 167 to the correct printing line. Shortly thereafter, bail 178 advances and springs 177 draw the type carriers to their appropriate positions. As type carriers 167 advance, the printing hammers 362 are conditioned for release and when the type carriers arrive opposite the printing position, the type slugs are struck.

The sensing of the hole in the control card causes the elevation of wire 412 and, thereby, the conditioning of the non-add shaft 410 and its associated mechanism. It is desired that in certain columns of the report only totals should be printed, and non-print bails 374 are positioned to restrain the printing hammers associated with those columns, during all cycles of the machine except that of totaling. Since data from each card must be accumulated, actuators 166, which move as a unit with type carriers 167, must be permitted to advance and return the accumulation of information occurring on the return of the actuator. In those units in which grand totals are to be accumulated, the link 217, and actuator 218 move with actuator 166.

When a total card is sensed the perforation therein initiates the operation of the total taking control mechanism and causes picker 47 to be locked against operation, card stop 70 to be held in effective position, and locking slides 102 to be temporarily held in retracted position during the ensuing spacing and total taking cycles. In the spacing cycle, the transfer mechanisms of the front and rear totalizers are restored to normal position. In the total taking cycle, total cam 140 serves to actuate T-link 264 and thereby rock total shaft 271. Total shaft 271, through its associated mechanism, will cause accumulator wheels 211 to be put in mesh with actuator 166 and will cause shaft 310 to withdraw the zero stops 169, permitting the actuators to advance until accumulator wheels 211 pass through zero whereupon they will be stopped. Thus, the amounts standing in the accumulators are set up on the actuators and the type carriers are advanced to the position which is correct for printing the amount.

During the total taking cycle, bails 374, associated with units from which totals are being taken, are rendered ineffective. Printing hammers 362 are released and a percussive blow upon the type slugs produce an imprint of the totals.

When grand totals are taken, the various mechanisms operate as under group totals, except that link 264 is moved forwardly to position for actuating grand-total shaft 276. Shaft 276, through associated mechanism causes front, or total, accumulator wheels 211 to be withheld from engagement with actuators 166 and causes rear, or grand total, accumulators 220 to be brought into engagement with grand-total actuators 219. Otherwise, the operation is the same as during a total taking cycle.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new and desire to secure by Letters Patent is:

1. In a record card controlled tabulating machine, the combination of a printing mechanism, a non-print bail for said printing mechanism, resilient means to render said non-print bail ineffective, positive means to render said bail effective against the tension of said resilient means, said positive means comprising a slide, adapted to be actuated by a moving part of said machine, for operating said bail, record controlled means to place said slide under the control of said moving part, means to retain said slide and said moving part in operative relationship during a plurality of cycles of machine operation and additional record controlled means to remove said slide from the control of said moving part.

2. In a record card controlled tabulating machine, the combination of a printing mechanism, a non-print bail for said printing mechanism, resilient means to urge said bail to ineffective position, and means to move said bail to effective position against the tension of said resilient means, said last recited means comprising a toothed slide for operating said bail, an actuating pawl mounted on a rockable frame and adapted to actuate said slide, a holding pawl to retain said slide in actuated position, means to rock said frame during each cycle of machine operation under control of a moving part of the machine, record controlled means to engage said pawls with said slide, and means to retain said pawls and said slide in engagement during a plurality of cycles of machine operation.

3. In a record card controlled tabulating machine, the combination of a printing mechanism, a non-print bail for said printing mechanism, resilient means to urge said bail to ineffective position, means to move said bail to effective position against the tension of said resilient means, said last recited means comprising a toothed slide for operating said bail, an actuating pawl mounted on a rockable frame for actuating said slide, a holding pawl to retain said slide in actuated position, means to rock said frame under control of a moving part of the machine during each cycle of machine operation, record controlled means to move said actuating pawl and said holding pawl to a position to engage said slide, means to retain said pawls in position to engage said slide during a plurality of cycles of machine operation, and additional record controlled means to move said pawls out of engaging position.

4. In a record card controlled tabulating machine, the combination of a printing mechanism, a non-print bail for said printing mechanism, resilient means to urge said bail to ineffective position, means to move said bail to effective position against the tension of said resilient means, said last recited means comprising a toothed slide for operating said bail positively, an actuating pawl pivotally mounted on a rockable frame for actuating said slide, a pivotally mounted holding pawl to retain said slide in actuated position, means to rock said frame under control of an oscillating part of the machine during each cycle of machine operation, record controlled means to position said pawls to engage with said slide, means including a latch to retain said pawls in position to engage with said slide during a plurality of cycles of machine operation, and additional record controlled means to release said pawls from the control of said latch.

5. In a machine adapted to tabulate data represented by perforations in a group of record cards and having a plurality of printing hammers arranged to be operated to effect printing during each tabulating cycle, a bail for said printing hammers settable to an effective or an ineffective position, said bail being arranged when effective to prevent the operation of said hammers and when ineffective to permit the operation of said hammers, resilient means to urge said bail to ineffective position, a slide adapted when operated to move said bail to effective position, operating means arranged to be actuated by a moving part of the machine for operating said slide, record controlled means for placing said slide under the control of said operating means, and additional record controlled means to remove said slide from the control of said operating means.

6. In a machine for tabulating groups of records, said groups comprising a plurality of item cards preceded by a control card, the combination of a printing mechanism, a non-print bail for said printing mechanism, means to urge said bail to ineffective position, actuating means to move the bail to effective position, operating means to cause step-by-step operation of said actuating means during successive machine cycles, means responsive to said control card to place said actuating means under control of said operating means, and a lost motion connection between the actuating means and the bail whereby the bail is moved to effective position after the tabulation of the first item card of each group.

7. In a machine for tabulating groups of records, said groups comprising a plurality of item cards, a control card and a total card, the combination of a printing mechanism, a non-print bail for said printing mechanism, means operative to urge the bail to ineffective position, actuating means operable to move the bail to effective position, operating means to cause step-by-step operation of said actuating means during successive machine cycles, means responsive to said control card to place said actuating means under control of said operating means, a lost motion connection between the actuating means and the bail whereby the bail is moved to effective position after the tabulation of the first item card of each group, and means responsive to the total card to remove the actuating means from the control of the operating means.

8. In a machine for tabulating groups of item cards, the combination of a printing mechanism, a non-print bail for said printing mechanism, resilient means to urge said bail to ineffective position, actuating means to move said bail to effective position against the tension of said resilient means, operating means to cause step-by-step operation of said actuating means during successive machine cycles, record controlled means to place said actuating means under control of said operating means prior to the tabulating of each group and a lost motion connection between said actuating means and said bail whereby said bail is moved to effective position after the tabulation of the first item card of each group.

9. In a machine for tabulating data contained in a group of record cards, said group comprising a plurality of item cards and a control card, the combination of a non-print bail, impositive means to urge the bail to ineffective position, actuating means to move the bail to effective position, operating means to cause step-by-step operation of the actuating means in successive machine cycles, the relation between the bail and the actuating means being such that the bail is moved to effective position after a predetermined number of steps of the actuating means, and means responsive to said control card to cause the operation of the actuating means by the operating means.

10. In a machine for tabulating data contained in groups of record cards, each group comprising a plurality of item cards preceded by a control card and followed by a total card, the combination of a non-print bail, resilient means to urge the bail to ineffective position, actuating means to move the bail to effective position, operating means to cause step-by-step operation of the actuating means in successive machine cycles, the construction and arrangement being such that the bail is moved to effective position after a predetermined number of steps of the actuating means, means responsive to the control card to cause the operation of the actuating means by the operating means, means to retain the actuating means in operated position during succeeding machine cycles, and means responsive to the total card to release said retaining means whereby the bail is returned to ineffective position by said resilient means.

11. In a machine for tabulating groups of record cards, each group comprising a plurality of item cards preceded by a control card and followed by a total card, the combination of a non-print bail, resilient means to urge the bail to ineffective position, actuating means to move the bail to effective position, operating means including a moving part of the machine to cause step-by-step operation of the actuating means in successive machine cycles, a lost motion connection between the bail and the actuating means whereby the bail is moved to effective position after a predetermined number of steps of the actuating means, means responsive to the control card to cause the operation of the actuating means by the operating means, and means responsive to the total card to render said last recited means ineffective whereby the bail is restored to ineffective position by said resilient means.

WILLIAM W. LASKER.